United States Patent
Niiyama et al.

(10) Patent No.: US 9,976,087 B2
(45) Date of Patent: May 22, 2018

(54) LIQUID CRYSTAL COMPOSITION AND LIQUID CRYSTAL OPTICAL DEVICE

(71) Applicant: Asahi Glass Company, Limited, Chiyoda-ku (JP)

(72) Inventors: Satoshi Niiyama, Chiyoda-ku (JP); Remi Kawakami, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days. days.

(21) Appl. No.: 15/206,740

(22) Filed: Jul. 11, 2016

(65) Prior Publication Data

US 2017/0037317 A1    Feb. 9, 2017

(30) Foreign Application Priority Data

Aug. 6, 2015    (JP) ................. 2015-155776

(51) Int. Cl.
*G02F 1/1333* (2006.01)
*C09K 19/56* (2006.01)
*G02F 1/1337* (2006.01)
*G02F 1/1339* (2006.01)
*C09K 19/04* (2006.01)

(52) U.S. Cl.
CPC ...... *C09K 19/56* (2013.01); *C09K 2019/0448* (2013.01); *G02F 1/133365* (2013.01); *G02F 1/133723* (2013.01); *G02F 2001/13398* (2013.01); *G02F 2001/133302* (2013.01); *G02F 2001/133742* (2013.01); *G02F 2201/124* (2013.01)

(58) Field of Classification Search
CPC ............ C09K 19/56; C09K 2019/0448; G02F 1/133365; G02F 1/133723; G02F 2001/133302; G02F 2001/133742; G02F 2001/13398; G02F 2201/124
USPC ....................... 252/299.01; 428/1.1
See application file for complete search history.

(56) References Cited

U.S. PATENT DOCUMENTS

| | | |
|---|---|---|
| 6,723,393 B1 | 4/2004 | Niyama et al. |
| 6,914,648 B2 | 7/2005 | Niyama et al. |
| 6,937,218 B2 | 8/2005 | Niyama et al. |
| 7,011,870 B2 | 3/2006 | Niyama et al. |
| 7,459,189 B2 | 12/2008 | Tahara et al. |
| 7,505,188 B2 | 3/2009 | Niyama et al. |
| 8,373,839 B2 | 2/2013 | Ito et al. |
| 8,525,967 B2 | 9/2013 | Ito et al. |
| 2003/0142057 A1 | 7/2003 | Niyama et al. |
| 2004/0105053 A1 | 6/2004 | Ozeki et al. |
| 2004/0233349 A1 | 11/2004 | Shibuya et al. |
| 2009/0147211 A1 | 6/2009 | Niyama et al. |
| 2012/0268692 A1* | 10/2012 | Kawakami ........ G02F 1/133711 349/96 |

FOREIGN PATENT DOCUMENTS

| | | |
|---|---|---|
| JP | 4-227684 | 8/1992 |
| JP | 2000-119656 | 4/2000 |
| JP | 2005-202391 | 7/2005 |
| WO | WO 2004/005426 A1 | 1/2004 |

* cited by examiner

*Primary Examiner* — Geraldina Visconti
(74) *Attorney, Agent, or Firm* — Oblon, McClelland, Maier & Neustadt, L.L.P.

(57) ABSTRACT

To provide a high quality liquid crystal optical device irrespective of the size of the liquid crystal optical device, while simplifying the production process, and a liquid crystal composition suitable for such a liquid crystal optical device. The liquid crystal composition of the present invention is a liquid crystal composition comprising a liquid crystal compound which shows liquid crystallinity and which is a non-curable compound, a liquid crystalline curable compound having a polymerizable functional group, and a non-liquid crystalline curable compound having a polymerizable functional group, wherein the content of the non-liquid crystalline curable compound is larger than the content of the liquid crystalline curable compound, and the total amount of the liquid crystalline curable compound and the non-liquid crystalline curable compound is at least 8 mass % and less than 20 mass % of the entirety.

20 Claims, 2 Drawing Sheets

LIQUID CRYSTAL COMPOSITION AND LIQUID CRYSTAL OPTICAL DEVICE

FIELD OF INVENTION

The present invention relates to a liquid crystal composition comprising a liquid crystal compound showing liquid crystallinity and curable compounds. Further, it relates to a liquid crystal optical device having an electrooptical functional layer which is optically modulated by switching on or off of a voltage.

BACKGROUND OF INVENTION

Liquid crystal optical devices have merits such as low power consumption, small thickness, light weight, etc., and they are widely used for many electronic devices such as cellphones, digital cameras, portable information devices, TVs, etc. Among these, in recent years, liquid crystal optical devices are proposed, in which the electric field is controlled to control alignment of liquid crystal molecules thereby to change a light-scattering state.

Patent Document 1 discloses a liquid crystal optical device wherein a polyimide thin film for vertical alignment is formed on a pair of substrates provided with electrodes, a mixture of a liquid crystal and an uncured curable compound is sandwiched between the substrates, and the curable compound is cured by light exposure in a state where the mixture shows a liquid crystal phase, to form a liquid crystal/curable composite layer. Further, Patent Document 2 discloses a liquid crystal optical device having an electrooptical functional layer containing a liquid crystal and a polymer, obtained in such a manner that a liquid crystalline mixture containing a specific bifunctional polymerizable compound and non-polymerizable liquid crystalline composition is sandwiched between a pair of substrates provided with electrodes, and the polymerizable compound is polymerized to form a polymer in a state where the mixture shows a liquid crystal phase. Patent Document 3 discloses a scattering type display cell comprising a polymerized liquid crystal monomer (a) and a low molecular liquid crystal material (b), wherein the polymerized liquid crystal monomer (a) constitutes a cross-linked network, and around this network, the low molecular liquid crystal material (b) constitutes a continuous phase to form an electrooptical functional layer.

A liquid crystal optical device using a liquid crystal polymer composite of a transmission/scattering operation mode employs a system such that the liquid crystal polymer composite is sandwiched between a pair of substrates provided with electrodes, and a voltage is applied to the electrodes to change optical properties of the liquid crystal, and such a device is also called a polymer dispersed liquid crystal device or a dispersed liquid crystal. Unlike a conventional TN mode liquid crystal optical device or the like, the transmission/scattering liquid crystal optical device does not require a polarizing plate in principle, and accordingly its absorption loss of light is small, it has high scattering properties, and its light utilization efficiency is high as a whole. By making use of such properties, it is used for light control glass, an optical shutter, a laser equipment, a display device, etc.

PRIOR ART DOCUMENTS

Patent Documents

Patent Document 1: JP-A-2000-119656
Patent Document 2: JP-A-2005-202391
Patent Document 3: JP-A-4-227684

SUMMARY OF INVENTION

Technical Problem

In a liquid crystal optical device having an electrooptical functional layer made of a liquid crystal polymer composite with a transmission/scattering operation mode, an optically functionable good electrooptical functional layer is formed via a phase separation process from the state of a liquid crystal composition. And, the shape, size and distribution of the polymer (the alignment controlling material) are substantially influential over the properties of the electrooptical functional layer. Like in the above Patent Document 3, if a liquid crystalline curable compound and a liquid crystal compound are used as the liquid crystal composition, it is possible to maintain compatibility of the liquid crystal composition to be good. However, because of the high compatibility, the size of the domain of the liquid crystal compound (hereinafter referred to as the liquid crystal domain) in the electrooptical functional layer obtained via the phase separation process, tends to be small.

If the liquid crystal domain was small, there was a case such that the driving voltage of the liquid crystal optical device tended to rise, or in the scattering mode of the electrooptical functional layer, light in a certain specific visible light region was scattered, while light in other visible light regions was transmitted so that a coloration phenomenon resulted. Further, due to the high compatibility of the liquid crystal composition, it is likely that the curing reaction is not sufficiently carried out so that an uncured curable compound will remain in the liquid crystal domain, and as a result, there may be a problem of deterioration of the quality or decrease in the yield.

As disclosed in the above Patent Document 2, by incorporating a non-liquid crystalline curable compound in the liquid crystal composition, it is possible to solve such a problem that the size of the liquid crystal domain becomes small or a problem that an uncured curable compound will remain in the liquid crystal domain. However, there was a problem such that as compared with the case of using a liquid crystalline curable compound, the compatibility of the liquid crystal composition deteriorated, and an uncured curable compound was phase-separated from the liquid crystal composition and precipitated. Therefore, curing treatment of the liquid crystal composition was conducted by heating to such a temperature where the compatibility of the liquid crystal composition was maintained. Therefore, in the production process for a liquid crystal optical device, it was required to properly control the temperature of the liquid crystal composition, and the handling efficiency of the liquid crystal composition was not good. Further, at the time of vacuum-injecting the liquid crystal composition into a cell, it was necessary to use an apparatus having a heating function. Therefore, for example, in the case of the ODF method, there was a case where, if the stage was not warmed up, the curable compound and the liquid crystalline curable compound in the liquid crystal composition underwent phase separation by the shock at the time of injection, to form a non-uniform electrooptical functional layer with irregularities in properties. Therefore, it was necessary to provide a mechanism to warm up the stage in the apparatus for the ODF method, which made it difficult to scale up the liquid crystal optical device.

In the above, problems in a transmission/scattering mode liquid crystal optical device have been described, however, the same problems may arise in a liquid crystal optical device of a mode such that optical properties such as the refractive index, etc. are changed by application/non-application of a voltage to conduct optical modulation.

The present invention has been made under these circumstances, and its object is to provide a high quality liquid crystal optical device regardless of the size of the liquid crystal optical device while simplifying the production process and to provide a liquid crystal composition suitable for such a liquid crystal optical device.

Solution to Problem

The present invention provides a liquid crystal composition and a liquid crystal optical device having constructions of the following [1] to [8].
[1] A liquid crystal composition comprising a liquid crystal compound which shows liquid crystallinity and which is a non-curable compound, a liquid crystalline curable compound having a polymerizable functional group, and a non-liquid crystalline curable compound having a polymerizable functional group, wherein the content of the non-liquid crystalline curable compound is larger than the content of the liquid crystalline curable compound, and the total amount of the liquid crystalline curable compound and the non-liquid crystalline curable compound is at least 8 mass % and less than 20 mass % of the entirety.
[2] The liquid crystal composition according to [1], wherein the non-liquid crystalline curable compound contains a compound represented by the formula (1):

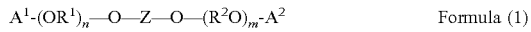

Formula (1)

wherein $A^1$ and $A^2$ are each independently an acryloyl group, a methacryloyl group, a glycidyl group or an allyl group, $R^1$ and $R^2$ are each independently a $C_{2-6}$ alkylene group, Z is a divalent mesogenic structure moiety, and n and m are each independently an integer of from 1 to 10.
[3] The liquid crystal composition according to [2], wherein the non-liquid crystalline curable compound further contains a compound represented by the formula (2):

Formula (2)

wherein $A^3$ to $A^5$ are each independently an acryloyloxy group, a methacryloyloxy group, a vinyl ether group, a vinyl group or a glycidyl ether group, $R^3$ is a linear or branched $C_{1-50}$ mono- to tri-valent organic group which may have one or more etheric oxygen atoms between carbon atoms, and p, q and r are each independently from 0 to 3, provided p+q+r=1 to 3.
[4] The liquid crystal composition according to any one of [1] to [3], wherein the content of the liquid crystalline curable compound is less than 10 mass % of the entirety.
[5] The liquid crystal composition according to any one of [1] to [4], wherein the liquid crystalline curable compound is a bifunctional curable compound.
[6] The liquid crystal composition according to any one of [1] to [5], to be used for forming the following electrooptical functional layer of a liquid crystal optical device which comprises a pair of substrates, at least one of which is transparent, an electrooptical functional layer sandwiched between the pair of substrates and containing a liquid crystal compound and an alignment controlling material for controlling the alignment of the liquid crystal compound, and an electric field applying means to generate an electric field in the electrooptical functional layer.
[7] A liquid crystal optical device comprising a pair of substrates, at least one of which is transparent, an electrooptical functional layer sandwiched between the pair of substrates, and an electric field applying means to generate an electric field in the electrooptical functional layer, wherein the electroopical functional layer contains a liquid crystal compound and an alignment controlling material for controlling the alignment of the liquid crystal compound, and the alignment controlling material is at least 8 mass % and less than 20 mass % based on the entire electrooptical functional layer, and as constituents of the alignment controlling material, the proportion of one derived from a non-liquid crystalline curable compound is larger than one derived from a liquid crystalline curable compound.
[8] The liquid crystal optical device according to [7], which exhibits a transparent state when no voltage is applied and exhibits a state to scatter incident light when a voltage is applied.

Advantageous Effects of Invention

According to the present invention, it is possible to provide a high quality liquid crystal optical device regardless of the size of the liquid crystal optical device while simplifying the production process. Further, it is possible to provide a liquid crystal composition suitable for such a liquid crystal optical device.

DETAILED DESCRIPTION OF INVENTION

Figure 1:
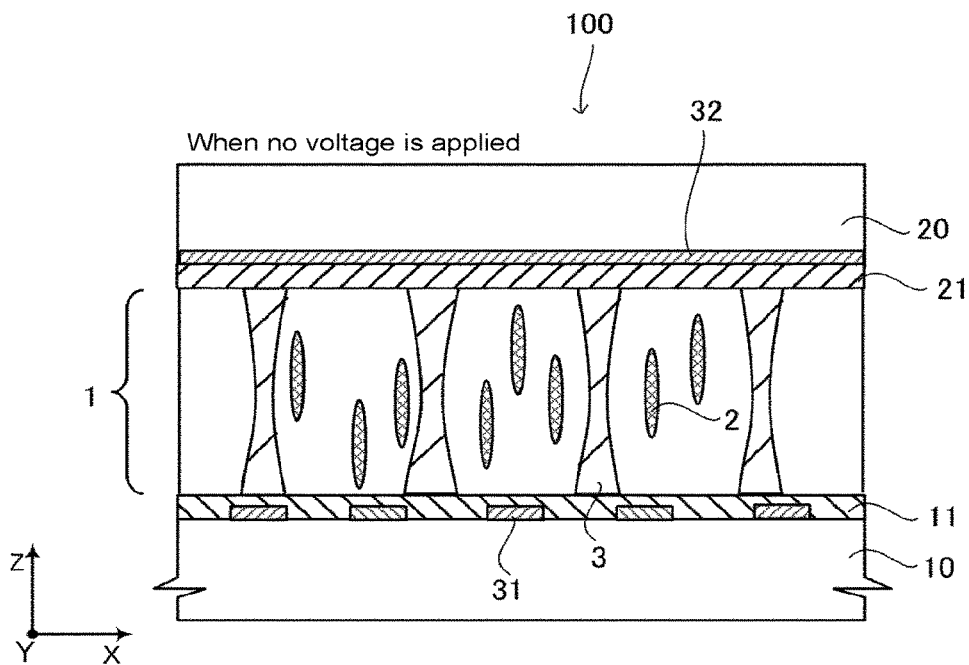
FIG. 1 is a view schematically illustrating a substantial part of a liquid crystal optical device according to a first embodiment when no voltage is applied.

The liquid crystal composition of the present invention (hereinafter referred to as the present composition) comprises a liquid crystalline curable compound having a polymerizable functional group and a non-liquid crystalline curable compound having a polymerizable functional group (hereinafter these compounds are generally referred to as curable compounds), and a liquid crystal compound. In the present composition, the content of the non-liquid crystalline curable compound is larger than the content of the liquid crystalline curable compound. As curable compounds, the liquid crystalline curable compound and the non-liquid crystalline curable compound are contained, whereby the compatibility with the liquid crystal compound will be excellent, precipitation of curable compounds will be less likely to occur, and handling efficiency will be excellent in the production of a liquid crystal optical device. In the curable compounds, the content of the non-liquid crystalline curable compound is larger than the content of the liquid crystalline curable compound, whereby at the time of producing a liquid crystal optical device by using the present composition, the size of the liquid crystal domain is less likely to be small. Therefore, it is possible to lower the driving voltage of the liquid crystal optical device.

Here, a "liquid crystalline curable compound" is meant for a compound showing liquid crystallinity as a single compound. A "non-liquid crystalline curable compound" is meant for a compound showing no liquid crystallinity as a single compound. A liquid crystal compound shows liquid crystallinity and is made of a non-curable compound.

The content of the curable compounds i.e. the total amount of the liquid crystalline curable compound and the non-liquid crystalline curable compound contained in the present composition, is at least 8 mass % and less than 20 mass % in the entire present composition. When the content of the curable compounds is less than 20 mass % in the entire present composition, the electrooptical functional layer of a liquid crystal optical device obtained by curing treatment of the present composition becomes to have good transmission-scattering optical properties to voltage application/non-application. And, when the content of the curable compounds is at least 8 mass %, the stability (long term reliability) of properties and the impact resistance of the liquid crystal optical device obtained by curing treatment of the present composition, can be made high. A more preferred range for the content of the curable compounds contained in the present composition is at least 10 mass % and at most 15 mass %.

By subjecting the present composition to curing treatment, it is possible to obtain an electrooptical functional layer comprising a liquid crystal domain and an alignment controlling material. The number of functional groups in each of the non-liquid crystalline curable compound and the liquid crystalline curable compound contained in the curable compounds is not limited, but is preferably from 1 to 3, and particularly preferred are the curable compounds each having 2 functional groups (bifunctional curable compounds).

The non-liquid crystalline curable compound preferably contains a compound represented by the formula (1):

$$A^1\text{-}(OR^1)_n\text{—}O\text{—}Z\text{—}O\text{—}(R^2O)_m\text{-}A^2 \qquad \text{Formula (1)}$$

Here, $A^1$ and $A^2$ are each independently an acryloyl group, a methacryloyl group, a glycidyl group or an allyl group, and $R^1$ and $R^2$ are each independently a $C_{2-6}$ alkylene group. Further, Z is a divalent mesogenic structure moiety. Z is preferably a 4,4'-biphenylene group or a 4,4'-biphenylene group having some or all of hydrogen substituted by $C_{1-2}$ alkyl or halogen atom. And, n and m are each independently an integer of from 1 to 10, preferably from 1 to 4 in consideration of the device properties after curing. More preferably, n and m are each independently 1, and particularly preferably both of them are 1.

$A^1$ and $A^2$ being curing sites in the formula (1) may be any of the above-mentioned functional groups which are usually photocurable or heat-curable together with a curing catalyst. Each of $A^1$ and $A^2$ is particularly preferably an acryloyl group or a methacryloyl group suitable for photocuring, whereby it is possible to control the temperature at the time of curing.

The number of carbon atoms in each of $R^1$ and $R^2$ as the oxyalkylene moieties in the formula (1) is from 2 to 6. It is thereby possible to make the mobility of the non-liquid crystalline compound to be preferable. The number of carbon atoms in each of $R^1$ and $R^2$ is preferably 2 or 3.

The mesogenic structure moiety (Z) in the formula (1) is preferably a divalent polyphenylene having at least two 1,4-phenylene groups linked. Here, it may be a divalent organic group having part of 1,4-phenylene groups in such a polyphenylene group substituted by a 1,4-cyclohexylene group.

Some or all of hydrogen atoms in such a polyphenylene group or divalent organic group may be substituted by a substituent such as a $C_{1-2}$ alkyl group, a halogen atom, a carboxy group or an alkoxycarbonyl group. Preferred Z is a biphenylene group having two 1,4-phenylene groups linked (hereinafter referred to as a 4,4'-biphenylene group), a terphenylene group having three 1,4-phenylene groups linked, or a divalent organic group having from 1 to 4 hydrogen atoms thereof substituted by a $C_{1-2}$ alkyl group, a fluorine atom, a chlorine atom or a carboxy group. Most preferred Z is a 4,4'-biphenylene group having no substituent.

In a case where a plurality of compounds represented by the formula (1) are used, n and m in them may be different. It is thereby possible to improve the compatibility between the liquid crystal compound and the compounds represented by the formula (1) and to make the contrast of the liquid crystal optical device high.

As specific examples of the non-liquid crystalline compound, compounds of the following chemical formulae (3) to (6) may be exemplified.

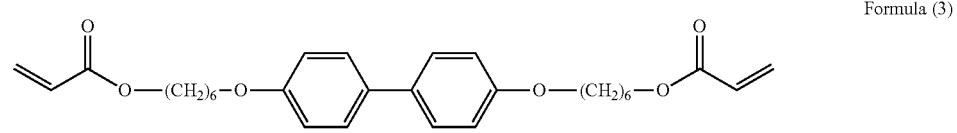

Formula (3)

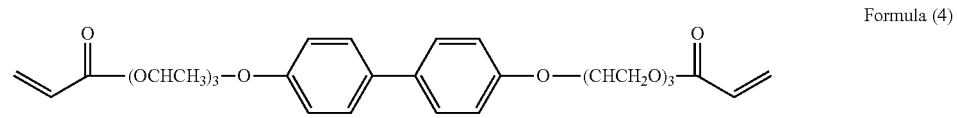

Formula (4)

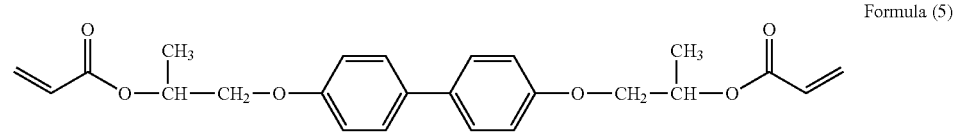

Formula (5)

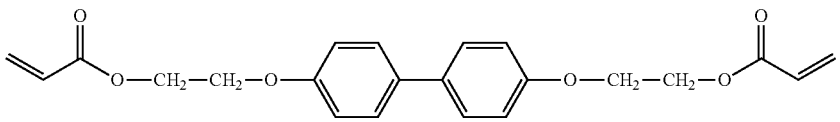

Formula (6)

The non-liquid crystalline curable compound preferably contains the compound represented by the formula (1) and the compound represented by the formula (2). It is thereby possible to increase the impact resistance of the optical device obtained by curing the present composition.

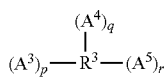

Formula (2)

Here, $A^3$ to $A^5$ are each independently an acryloyloxy group, a methacryloyloxy group, a vinyl ether group, a vinyl group or a glycidyl ether group, and $R^3$ is a linear or branched $C_{1-50}$ mono- to tri-valent organic group which may have one or more etheric oxygen atoms between carbon atoms. And p, q and r are each independently from 0 to 3, provided p+q+r=1 to 3. More preferably, $A^3$ to $A^5$ are each independently an acryloyloxy group, a methacryloyloxy group or a vinyl ether group. A preferred example of $R^3$ is $-R^4-$ or $(R^5-O)_n-R^5-$. Here, $R^4$ is a $C_{2-20}$ linear or branched alkylene group, $R^5$ is a $C_{2-8}$ linear or branched alkylene group, and n is an integer of from 1 to 10. $R^4$ is more preferably a $C_{2-20}$ linear alkylene group, and more preferred $R^5$ is $-(CH_2)_s-$, $-CH_2-CH(CH_3)-$, $-CH_2-CH_2-CH(CH_3)-$ or $-CH_2-CH_2-C(CH_3)_2-$ (wherein s is an integer of from 2 to 5), and n is more preferably from 1 to 6. As a more preferred compound of the compound represented by the formula (2), $A^3$-$R^3$-$A^4$ may be exemplified.

By containing the compound represented by the formula (2) as the non-liquid crystalline curable compound, the degree of freedom for intramolecular rotation among polymerizable groups becomes high, whereby the flexibility of the alignment controlling material obtainable by curing of the curable compounds will be improved. Further, it is possible to improve the reactivity for polymer phase separation. With a view to further improving the flexibility, it is preferred that the number of etheric oxygen atoms in the formula (2) is large. Further, the number of carbon atoms of $R^3$ is preferably at least 8, more preferably at least 11. It is thereby possible to suppress volatilization of volatile components from the present composition, when employing a production method of vacuum injection of the present composition into a liquid crystal cell.

As specific examples of the formula (2), the following formulae (7) to (11) may be mentioned.

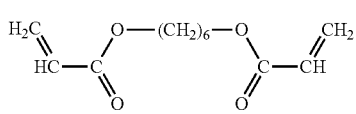

Formula (7)

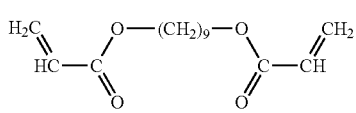

Formula (8)

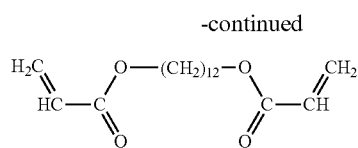

Formula (9)

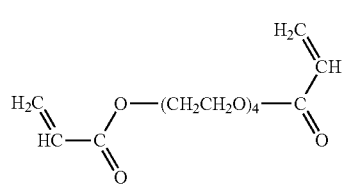

Formula (10)

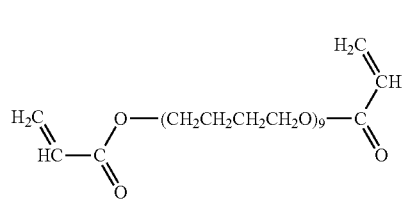

Formula (11)

Now, the liquid crystalline curable compound will be described. The liquid crystalline curable compound has a mesogen which becomes a core showing the rigidity of the compound, and a flexible unit. The temperature at which the liquid crystalline compound shows liquid crystallinity is not particularly limited. With a view to increasing the contrast of the liquid crystal optical device, the content of the liquid crystalline curable compound is preferably less than 10 mass % of the entire present composition.

As preferred examples of the liquid crystalline curable compound, compounds of the following formulae (12) to (28) may be exemplified.

Formula (12)
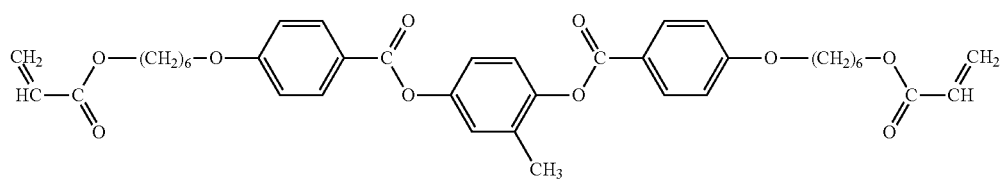
Formula (13)
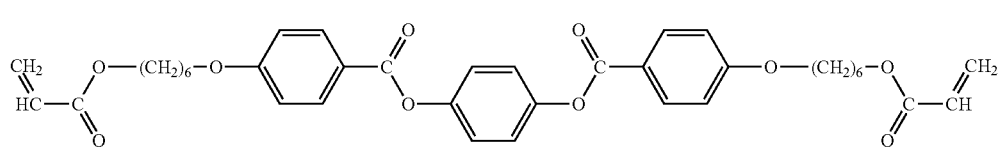
Formula (14)
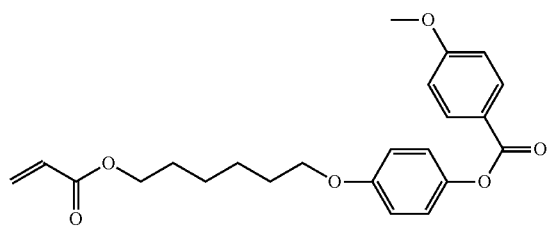
Formula (15)
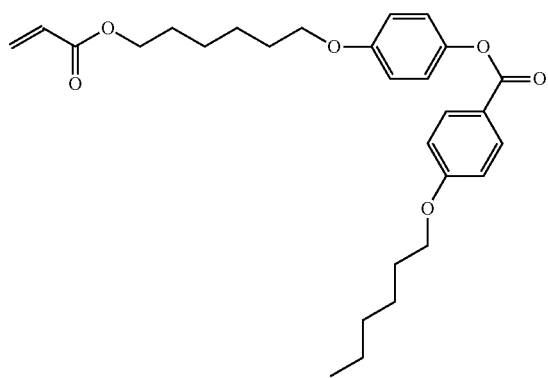
Formula (16)
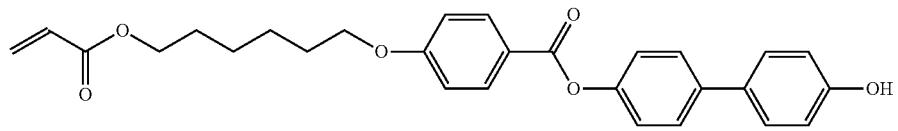
Formula (17)
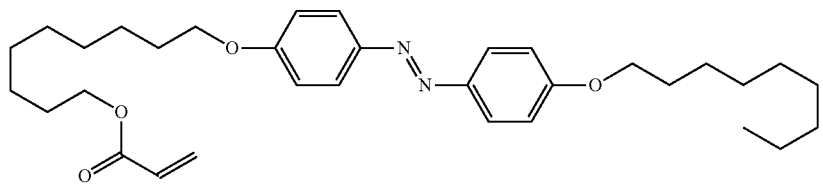
Formula (18)
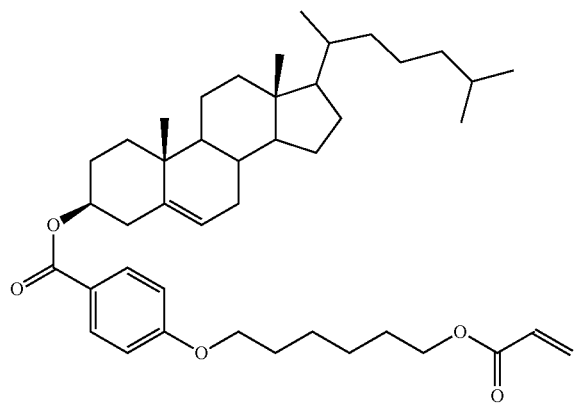

Formula (19)
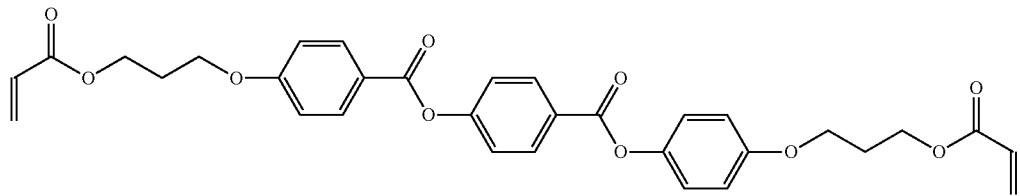
Formula (20)
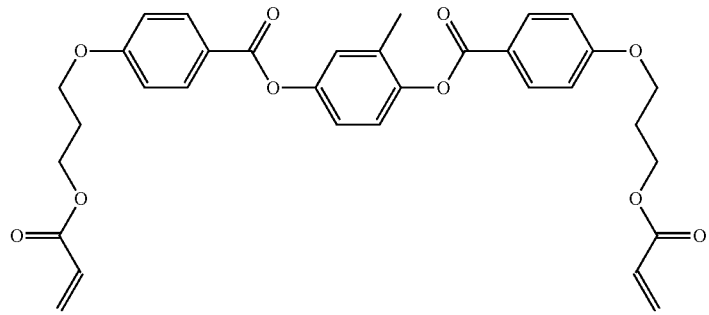
Formula (21)
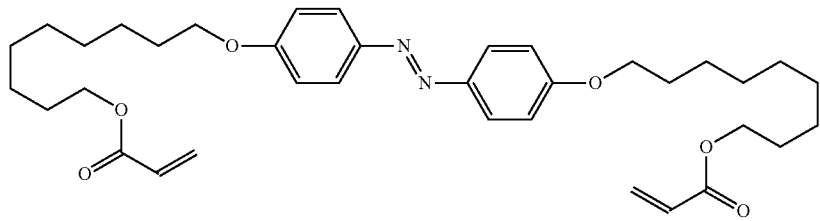
Formula (22)
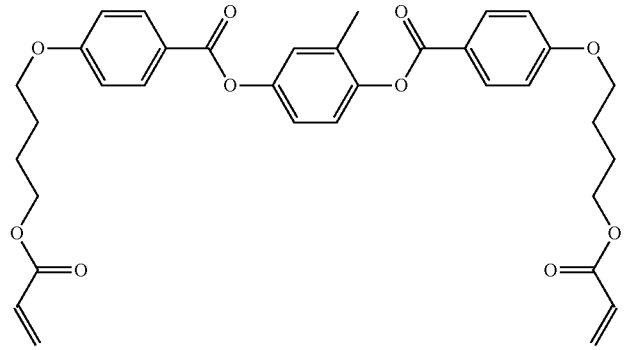
Formula (23)
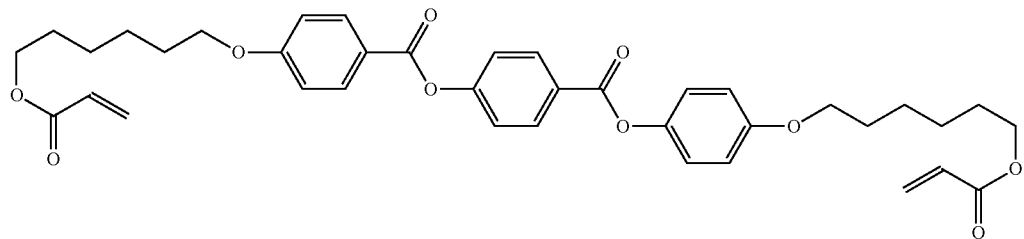

Formula (24)
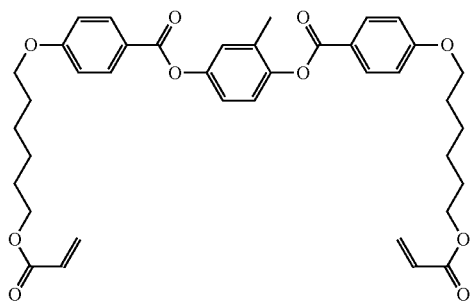

Formula (25)
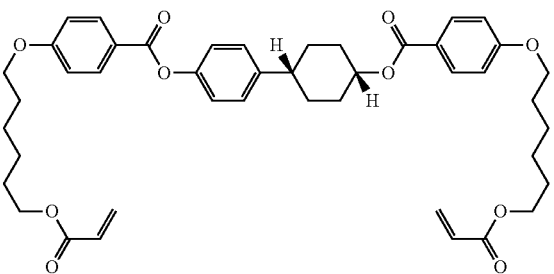

Formula (26)
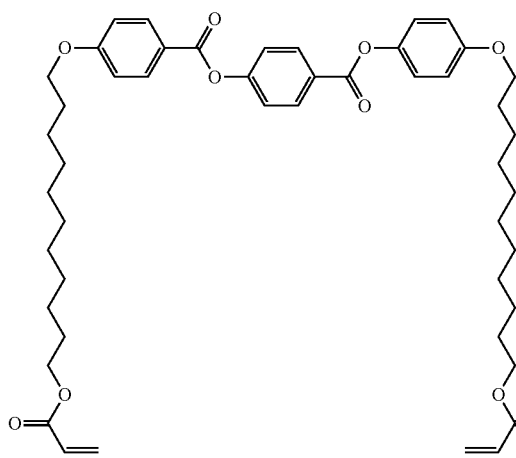

Formula (27)
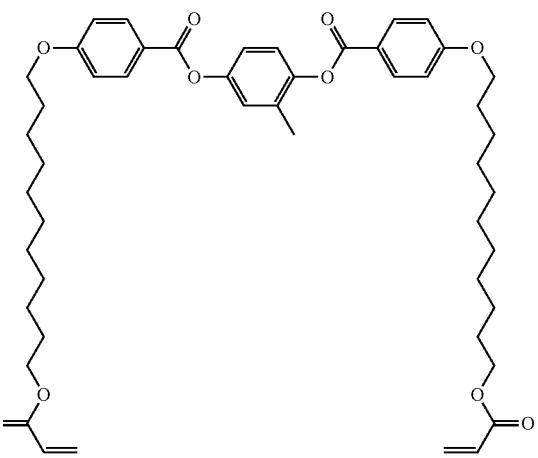

Formula (28)
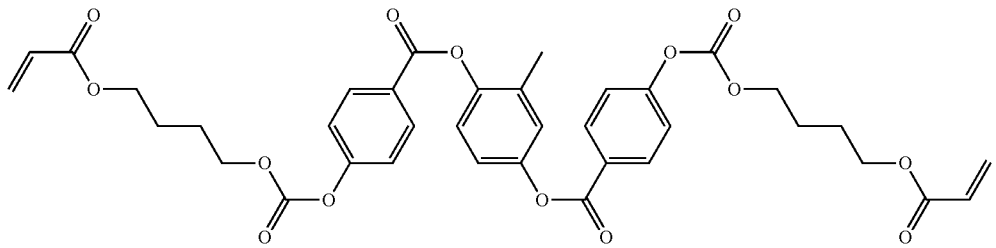

The dielectric anisotropy of the liquid crystal compound may be positive or negative. A case where the value of the dielectric constant $\in_A$ in the long axis direction of the compound is larger than the value of the dielectric constant $\in_B$ in the short axis direction of the compound (a case where the value of $\Delta\in = \in_A - \in_B$ is positive), is a positive dielectric constant, and a case where $\in_B$ is larger than $\in_A$, is a negative dielectric constant. The larger the absolute value of the dielectric anisotropy, the better, with a view to reducing the driving voltage of the liquid crystal device obtained by curing the present composition. As a liquid crystal compound having a large absolute value of the dielectric anisotropy, a compound having a cyano group as a substituent, or a compound having a halogen atom such as fluorine or chlorine as a substituent, is preferred. In particular, when a compound having a cyano group as a substituent is used as a liquid crystal compound, it is possible to sufficiently reduce the driving voltage of the liquid crystal optical device. On the other hand, when a compound having a fluorine atom as a substituent is used, it is possible to increase the reliability of the liquid crystal optical device.

The liquid crystal is usually used in an environment in which it shows a liquid crystal phase, however, use in an isotropic phase is not excluded.

As the liquid crystal compound, nematic liquid crystal, cholesteric liquid crystal, smectic liquid crystal, ferroelectric liquid crystal, etc. may be used. The liquid crystal compound is preferably nematic liquid crystal in view of a wide operating temperature range and a high operating speed. The liquid crystal compound may be composed of a single type of liquid crystal compound, or a mixture of two or more types of liquid crystal compounds.

As the liquid crystal compound in the present composition, various ones to be used as materials for electric field drive display devices may be used. As such liquid crystal compounds, specifically, biphenyl type, phenyl benzoate type, cyclohexylbenzene type, azoxybenzene type, azobenzene type, azomethine type, terphenyl type, biphenyl benzoate type, cyclohexyl biphenyl type, phenyl pyridine type, cyclohexyl pyrimidine type, cholesterol type, etc. may be mentioned.

The present composition may contain other components in addition to the above-mentioned curable compounds and liquid crystal compound.

As another component, a curing catalyst may, for example, be mentioned.

In a case where the method for curing the present composition is photo-curing, as the curing catalyst, a photopolymerization initiator which is commonly used for a photocurable resin, such as a benzoin ether type, acetophenone type or phosphine oxide type, may, for example, be mentioned.

In a case where the method for curing the present composition is heat-curing, as the curing catalyst, a peroxide type, thiol type, amine type or acid anhydride type, may, for example, be mentioned. Further, in a case where the curing method is heat-curing, as the case requires, a curing aid such as an amine, may be contained in the present composition.

The content of the curing catalyst to be contained in the present composition is preferably at most 20 mass % of the curable compounds. In a case where the alignment controlling material obtained by curing the curable compounds is required to have a high molecular weight and a high specific resistance, the content of the curing catalyst is more preferably made to be from 1 to 10 mass % of the curable compounds.

As another component, for example, for the purpose of improving the contrast, a dichroic dye such as an anthraquinone type, styryl type, azomethine type or azo type may be mentioned. The dichroic dye is preferably compatible with the liquid crystal compound and incompatible with curable compounds. Further, as another component, with a view to improving the stability and the durability, an antioxidant, an ultraviolet absorber or a various plasticizer may be mentioned. Further, as another component, a chiral agent is mentioned. By incorporating a chiral agent, it is possible to increase the contrast at the time of electric field application/non-application of the liquid crystal optical device obtainable by curing the present composition.

The present composition is preferably a homogeneous solution after the liquid crystal compound and the curable compounds are mixed. Further, the mixture of the liquid crystal compound and the curable compounds may show a liquid crystal phase when it is sandwiched between substrates provided with electrodes.

Now, a case where the liquid crystal composition of the present invention is applied to a liquid crystal optical device, will be described. However, the liquid crystal optical device is not limited to the following embodiment, and other embodiments fall into the scope of the present invention so long as they are within the concept of the present invention. The sizes and the proportions of the members in drawings are for convenience in illustration and are different from actual ones. Further, as each compound described hereinafter, one type may be used alone, or two or more types may be used in combination, unless otherwise specified.

The liquid crystal optical device of the present invention (hereinafter referred to as the present optical device) is capable of reversibly controlling the optical modulation by application of a driving voltage. For optical modulation, there are a mode such that the light transmission state and the light scattering state are reversibly controlled by application or non-application of a driving voltage, and a mode such that optical properties such as the refractive index, etc. are reversibly controlled in accordance with application of a driving voltage. Such optical modulation is usually applied to visible light, however, light rays in a band other than the visible light (hereinafter referred to as another band) may be utilized depending upon the purpose of use. As the transmission/scattering mode of a liquid crystal optical device, there are a normal mode and a reverse mode. The normal mode is one constructed so that the light transmission state is brought about when the voltage is applied, and the light scattering state is brought about when the voltage is not applied, and the reverse mode is one constructed so that the light scattering state is brought about when the voltage is applied, and the light transmission state is brought about when the voltage is not applied. Although it may depend on the application or the purpose of use, it is usually preferred to have the light transmission state when the voltage is not applied so as to avoid such a situation that the presence of the liquid crystal optical device itself becomes eyesore or obtrusive to the user. Therefore, in the present invention, a case of a reverse mode will be described, but the present invention is applicable also to a normal mode.

[First Embodiment]

In the first embodiment, an example of a liquid crystal optical device which uses a liquid crystal composition containing a liquid crystal compound having a negative dielectric anisotropy and which has an electric field applying means with a vertical electric field, will be described. FIG. 1 is a view schematically illustrating a substantial part of an example of the liquid crystal optical device according to the first embodiment. FIG. 1 illustrates a state where no voltage is applied. A liquid crystal optical device 100 according to the first embodiment comprises a pair of planner first substrate 10 and second substrate 20 disposed to face each other with a certain space.

On a surface of the first substrate 10 facing the second substrate 20, a first electrode 31 is formed, and a first alignment functional layer 11 is formed so as to cover the first electrode 31. Likewise, on a surface of the second substrate 20 facing the first substrate 10, a second electrode 32 is formed, and a second alignment functional layer 21 is formed so as to cover the second electrode 32. A spacer (not shown) is provided to maintain a prescribed space between the first substrate 10 and the second substrate 20, a peripheral seal (not shown) is formed at the outer peripheral edge portion between the first substrate 10 and the second substrate 20, and the two substrates are bonded by the peripheral seal. And, an electrooptical functional layer 1 is sealed in a space surrounded by the first substrate 10, the second substrate 20 and the peripheral seal. By providing an insulating layer (not shown) between the first electrode 31 and the first alignment functional layer 11, it is possible to effectively prevent short-circuiting when a current is applied in a case where an electrically conductive foreign matter is included between the first substrate 10 and the second substrate 20. The same applies between the second electrode 32 and the second alignment functional layer 21.

At least one of the first substrate 10 and the second substrate 20 is a transparent substrate which is transparent to visible light. Both the first substrate 10 and the second substrate 20 may be transparent substrates, or they may be substrates transparent to light in another band depending upon the purpose of use. For the first substrate 10 and the second substrate 20, for example, a transparent glass substrate or a resin substrate such as a polyester film, or a substrate made of a combination thereof, may be used. The first substrate 10 and the second substrate 20 are not necessarily substrates made of the same material, and various substrates such as a reflecting substrate, a semi-transmissive half mirror substrate, etc. may be used depending upon the purpose of use.

The first electrode 31 and the second electrode 32 have a role to generate an electric field in the electrooptical functional layer 1. The electric field applying means in the first embodiment may be one to generate an electric field having lines of electric force in a direction substantially perpendicular to the substrate surface. Here, the perpendicular direction is not required to be strictly perpendicular to the substrate surface, and the lines of electric force may be tilted from the perpendicular direction to the substrate surface within a range where the reverse mode is possible.

It is preferred to use a transparent electrically conductive film for the first electrode 31 and the second electrode 32. The transparent electrically conductive film may, for example, be a film of a metal oxide such as ITO (indium tin oxide) or tin oxide. For example, a transparent electrically conductive film-attached glass comprising a glass substrate as the first substrate 10 or the second substrate 20 and a pattern of a metal oxide such as ITO formed as the first electrode 31 or the second electrode 32, a transparent electrically conductive film-attached polyester film having an ITO film formed on a polyethylene terephthalate (PET), or a transparent electrically conductive film-attached PES (polyether sulfone) may be used. Instead of the transparent electrically conductive film, an electrode by narrow lines of a metal film, or an electrode by nanoimprint or by drawing using an electrically conductive ink containing metal nanowires or nanoparticles may be employed.

The electrooptical functional layer 1 is a liquid crystal/polymer composite layer, and comprises a liquid crystal compound 2 and an alignment controlling material 3. The alignment controlling material 3 plays a role of controlling the alignment of the liquid crystal compound 2. The electrooptical functional layer 1 becomes to be the main constituting element for developing the optical function in the present optical device. In FIG. 1, for convenience in illustration, several molecules of the liquid crystal compound 2 are shown, however, in practice, a region where the alignment controlling material 3 is not formed is filled with the liquid crystal compound 2. In the electrooptical functional layer 1, the phase of the liquid crystal compound 2 (the liquid crystal phase) forms an entirely continuous phase, but divided into a plurality of liquid crystal domains by the presence of the alignment controlling material 3.

The electrooptical functional layer 1 is formed from the state of a uniform solution of the present composition via a phase separation process. In a case where the phase separation is inadequate in the phase separation process, a trouble is likely to occur such that the driving voltage to operate liquid crystal becomes high or such that it becomes inoperable as a liquid crystal optical device. Here, the phase separated structure is meant for an internal structure of a liquid crystal cell, which is formed via the phase separation process and which is capable of producing electrooptical properties and functions. Via the above process, in the electrooptical functional layer 1, the components derived from the curable compounds are contained in an amount of at least 8 mass % and less than 20 mass %, to the entire electrooptical functional layer 1. Further, the constituting components of the alignment controlling material 3 are characterized in that the proportion of the component derived from the non-liquid crystalline curable compound is larger than the proportion of the component derived from the liquid crystalline curable compound.

The phase separated structure of the liquid crystal/polymer composite may have its fine shape variously changed depending upon e.g. the types, natures, mixing ratios, etc. of compounds constituting the present composition. The combination and mixing ratios of the materials to be used, are determined in consideration of optical properties such as the transmission-scattering properties, etc., the degree of the driving voltage or reliability of the present optical device. In order to obtain a high quality electrooptical functional layer 1 having uniform transmission-scattering electrooptical properties, it is preferred to suitably select the types and mixing ratios of the blend materials and to make the present composition to be uniform.

The electrooptical functional layer 1 may contain other components in addition to the liquid crystal compound 2 and the alignment controlling material 3, for the purpose of improving the contrast ratio or the stability of the present optical device. For example, for the purpose of improving the contrast, a dichroic dye such as an anthraquinone type, styryl type, azomethine type or azo type may be mentioned as such another component. The dichroic dye is preferably compatible with the liquid crystal compound and incompatible with the curable compounds. Further, as another component, an antioxidant, an ultraviolet absorber or a various plasticizer may be mentioned with a view to improving the stability or the durability.

The alignment controlling material 3 has a role to control the liquid crystal compound 2 so that the long axes of molecules of the liquid crystal compound 2 are aligned substantially in one direction in the electrooptical functional layer 1 when no voltage is applied. Here, alignment "substantially in one direction" includes alignment of the liquid crystal compound in such a level that the liquid crystal compound has an ordered structure of the optical wavelength or less and the transparency can be maintained. Further, the alignment controlling material 3 has a role to change the long axis directions of molecules of the liquid crystal compound in a plurality of directions different from the direction controlled when no voltage is applied, by the electric field and the alignment controlling material 3, when a voltage is applied. When an electric field is generated in the electrooptical functional layer 1 by the first electrode 31 and/or the second electrode 32 functioning as an electric field applying means, at least part of molecules of the liquid crystal compound 2 are changed in directions different from the direction controlled by the alignment controlling material 3. Thus, optical modulation is conducted by switching between voltage application and voltage non-application. In the first embodiment, the transmission state is changed to the scattering state by switching between voltage application and voltage non-application.

Figure 2:
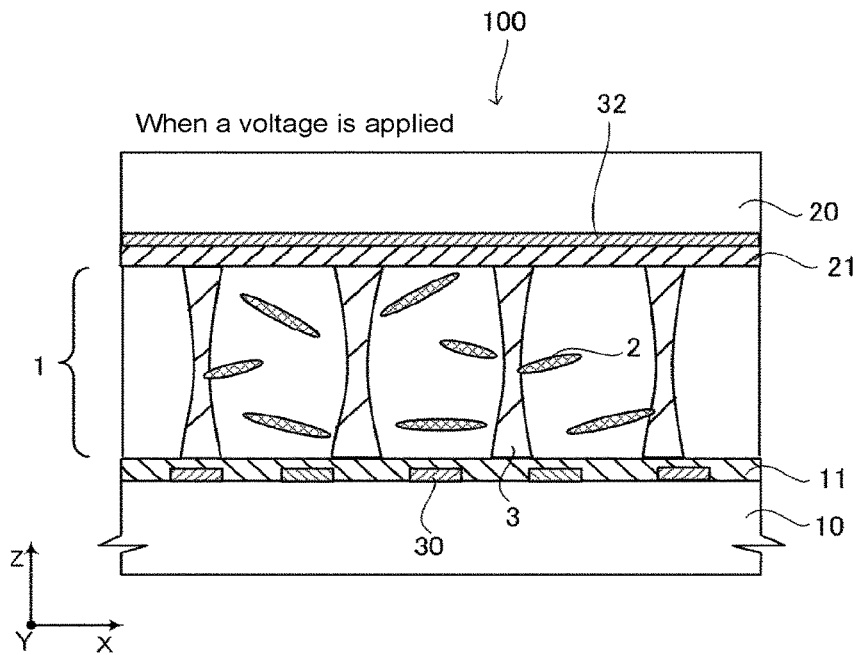
FIG. 2 is a view schematically illustrating a substantial part of a liquid crystal optical device according to the first embodiment when a voltage is applied.

In FIG. 2, a drawing schematically illustrating a substantial part of the liquid crystal optical device 100 according to the first embodiment when a voltage is applied is shown. The principle as to how the transmission state is changed to the scattering state by switching between voltage application and voltage non-application is considered to be as follows. When a voltage is applied, an electric field containing lines of electric force in a direction substantially perpendicular to the substrate surface is generated, and the short axes of molecules of the liquid crystal compound 2 tend to move so as to agree with the direction of the lines of electric force. At that time, the molecules of the liquid crystal compound 2 in the vicinity of the alignment controlling material 3 are prevented from moving so as to agree with the direction of the lines of electric force by the alignment controlling material 3, and they take directions different from the lines of electric force. That is, by using the alignment controlling material 3, not all the long axes of the liquid crystal compound 2 are aligned in a direction which agrees with the lines of electric force when a voltage is applied, and the long axes of the liquid crystal compound 2 are in a plurality of directions. As a result, the ordered structure is disturbed, to show a scattering state. Here, the directions of the long axes of the liquid crystal molecules in FIG. 2 are for convenience in illustration, and in practice, the average direction (director) of the long axes of the liquid crystal molecules in the liquid crystal domain is not in parallel with the substrate surface, since alignment is disturbed by the alignment controlling material 3 having a complicated shape, and the liquid crystal molecules are aligned multidirectionally with a vector component in a parallel direction.

The average direction of the long axes of the liquid crystal molecules preferably substantially agree with the normal direction of the substrate surface of at least one of the pair of substrates when no voltage is applied. And, when a voltage is applied, the long axes of the liquid crystal molecules are preferably aligned in a plurality of directions including a direction component in parallel with the substrate surface of at least one of the pair of substrates.

The alignment controlling material 3 consists of a polymer structure. As the polymer structure, a columnar polymer structure or a network polymer structure may be exemplified. The polymer structure is formed by curing of the curable compounds in the present composition. In the first embodiment, an example of the polymer structure made of an aggregate of a plurality of resin columns will be described. The resin columns are preferably a mixture of resin columns the long axis directions of which substantially agree with the normal direction to the surface of the substrate provided with an electrode, and resin columns tilted from the normal direction. Here, the resin columns tilted from the normal direction mean resin columns the long axis directions of which are tilted based on the normal of the substrate surface.

With a view to increasing the impact resistance, the polymer structure in the electrooptical functional layer 1 preferably has a plurality of aggregates of the resin columns, and each of the aggregates of the resin columns has an axis center which substantially agrees with the normal direction of the surface of the substrate provided with an electrode, and the area occupied by the resin columns in the electrooptical functional layer in a plane horizontal to the surface of the substrate with an electrode becomes small as the plane is apart from the substrate with an electrode.

Further, with a view to improving the impact resistance, it is preferred to form the domain region of the liquid crystal so that the aggregates of the resin columns are connected. Here, the liquid crystal domain region means a space occupied by the liquid crystal molecules. The resin columns may or may not be chemically or physically adhered to the substrate surface formed by e.g. an alignment film.

The thickness of the electrooptical functional layer 1 is usually from 1 to 50 µm, preferably from 3 to 30 µm. If the space between the substrates is too small, the contrast will decrease, and if the space is too large, the driving voltage will increase.

The first alignment functional layer 11 and the second alignment functional layer 21 are formed respectively on the first substrate 10 and the second substrate 20, are in contact with the electrooptical functional layer 1, and have a role to align a precursor of the polymer structure which is the alignment controlling material 3 in the electrooptical functional layer 1 in a desired direction during production. In other words, the first alignment functional layer 11 and the second alignment functional layer 21 are formed on the outer sides of the electrooptical functional layer 1. On the first alignment functional layer 11 and the second alignment functional layer 21, a layer of the polymer structure is formed substantially entirely. The material of each of the first alignment functional layer 11 and the second alignment functional layer 21 is not particularly limited, and for example, a polyimide, a silane compound having an alkyl group or a fluoroalkyl group, or an olefin compound may be mentioned. From the viewpoint of heat resistance and stiffness, a polyimide is preferred. Such alignment functional layers may be formed, for example, by a rubbing treatment or a photo-alignment method on a thin film. In order to form resin columns in the normal direction on the substrate surface, a method of using a vertical alignment functional layer as the first alignment functional layer 11 and the second alignment functional layer 21 is simple, and by such a method, no rubbing treatment is necessary. In the first embodiment, so long as the alignment controlling material 3 is formed, the first alignment functional layer 11 and the second alignment functional layer 21 may not necessarily be formed.

The spacer has a role to define the thickness of the liquid crystal cell. The thickness of the electrooptical functional layer 1 sandwiched between the substrates is defined by the spacer. As the material for the spacer, for example, glass particles, resin particles, alumina particles, glass fibers or a film may be used. As the shape of the spacer, a spherical spacer, a fibrous spacer or a columnar spacer may, for example, be mentioned. A wall-shape or rectangular spacer may be provided by means of photolithography.

Now, an example of a method for producing the electrooptical functional layer according to the first embodiment will be described. However, the present invention is by no means restricted to the following production method.

In a case where the first substrate 10 and the second substrate 20 are film substrates, the electrode-attached first substrate 10 and second substrate 20 continuously supplied are sandwiched between two rubber rollers or the like, and a liquid having a spacer dispersed in the mixed liquid is supplied and sandwiched between the substrates, followed by continuous polymerization, whereby the productivity is high.

In a case where the first substrate 10 and the second substrate 20 are glass substrates, a very small amount of a spacer is spread on their surfaces, four sides of the facing substrates are sealed by a sealing agent such as an epoxy resin to form a sealed cell, at least two cutouts are provided in the seal, so that one of the cutouts is dipped in the mixed liquid and the mixed liquid is sucked through another cutout, whereby the liquid crystal cell is filled with the mixed liquid, and the mixed liquid is polymerized. In the case of a relatively small cell, a cell having at least one cutout in the seal can be filled with the mixed liquid without bubbles by a vacuum injection method, such being preferred. In a case where a large cell is to be prepared, the mixed liquid is applied by a dispenser or an inkjet head to the inner side of a curable sealing material provided at the periphery of one of the first substrate 10 and the second substrate 20, and the other substrate is laminated in a reduced pressure atmosphere and bonded by means of the sealing material at the periphery, and then the pressure is recovered to an atmospheric pressure, and the peripheral sealing material is cured e.g. by UV light (ODF method).

First, the first electrode 31 and the second electrode 32, the first alignment functional layer 11, the second alignment functional layer 21, etc. are formed on the first substrate 10 and the second substrate 20. After the alignment film is baked, an alignment treatment such as rubbing is carried out as the case requires. Then, on the alignment film-formed side of the first substrate 10, a spacer is spread by a spreader. On the second substrate 20, a sealing material is applied. The first substrate 10 and the second substrate 20 are positioned by e.g. alignment marks, and contact-bonded by heating. The space between substrates after contact-bonding is kept by the spacer.

Then, the present composition is injected between the substrates and sealed. As a sealing method, a known method may be used.

Then, an external stimulus is applied to the present composition to form the electrooptical functional layer 1 between the pair of substrates. The external stimulus may, for example, be irradiation with light such as visible light rays, ultraviolet rays or electron beams, or heat. Particularly, with a view to readily controlling the temperature at the time of polymerization, irradiation with light is preferred as the external stimulus. Among irradiation with light, it is more preferred to use ultraviolet rays in view of handling efficiency, easiness of production, etc. As a light source for ultraviolet rays, a high pressure mercury lamp, a low pressure mercury lamp, a metal halide lamp, a chemical lamp or an LED lamp may, for example, be used.

A process step of forming an electrooptical functional layer 1 via a phase separation process by applying ultraviolet irradiation to the present composition will be described.

In a case where the present composition is polymerized by irradiation with light, the light irradiation conditions are set depending upon the types of the curable compounds in the present composition. In a case where the present composition is directly irradiated, the intensity of irradiation light is preferably from 0.1 to 400 mW/cm$^2$. If it is less than 0.1 mW/cm$^2$, the phase separation rate tends to be low and the scattering intensity tends to decrease, and if it exceeds 400 mW/cm$^2$, a decomposition reaction may occur by a photoreaction, and the retention may decrease.

The temperature at the time of light irradiation is preferably within a temperature range within which the present composition can show a liquid crystal phase. If polymerization is conducted at a temperature lower than the compatible temperature at which the present composition shows a compatible state, phase separation may occur before photopolymerization, and a liquid crystal/polymer composite in which the liquid crystal domain is non-uniform, may be formed. Further, if the temperature of the present composition is too high, the present composition may undergo phase transition from a liquid crystal phase to an isotropic phase, whereby scattering/transmission electrooptical properties of a liquid crystal optical device may not be secured. In order to conduct polymerization under uniform conditions (light irradiation and polymerization temperature) over the entire surface of the liquid crystal optical device 100, the polymerization of the curable compounds contained in the present composition, is preferably carried out in a constant environment using a temperature controlling device such as a constant temperature chamber or a fan.

In the present composition, the compatibility of the liquid crystal compound and the curable compounds in the liquid crystal composition is high, and therefore, when a liquid crystal optical device is produced by using the present composition, the curable compounds are polymerized without undergoing phase separation, and division of the liquid crystal domain will be proper, whereby a high quality liquid crystal optical device can be obtained. Therefore, it becomes unnecessary to provide means to prevent precipitation of curable compounds from the liquid crystal composition by e.g. a heating process, etc. Thus, there is such an excellent effect that it is possible to produce a large sized liquid crystal optical device having excellent properties by using a large-sized substrates. Here, it is not excluded to carry out a heating process in the step of curing treatment of the liquid crystal composition.

Further, according to the liquid crystal optical device using the present composition, the contrast of the liquid crystal optical device is high, and coloration of transmission light in the scattering state can be prevented. This is considered to be attributable to that at the stage of phase separation to form an alignment controlling material by polymerizing the curable compounds contained in the present composition, a phase separation structure having a proper liquid crystal domain diameter is formed.

[Second Embodiment]

Now, another embodiment different from the first embodiment will be described. Here, the same elements and the same members as in the first embodiment will be identified by the same reference symbols and their descriptions may be omitted.

Figure 3:
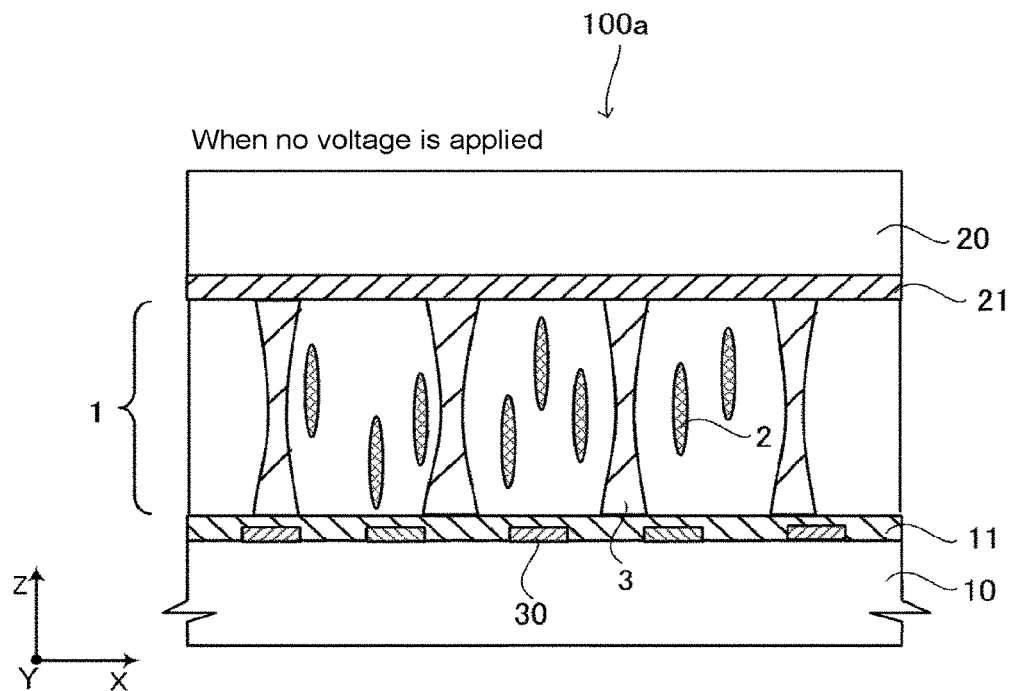
FIG. 3 is a view schematically illustrating a substantial part of a liquid crystal optical device according to a second embodiment when no voltage is applied.

In the second embodiment, an example of a liquid crystal optical device which uses a liquid crystal composition containing a liquid crystal compound having a positive dielectric anisotropy and which has an electric field applying means with a horizontal electric field, will be described. FIG. 3 is a cross-sectional view schematically illustrating the liquid crystal optical device according to the second embodiment. In the liquid crystal optical device 100a, an electric field applying means 30 is formed on a main surface of the first substrate 10 on which the electrooptical functional layer 1 is disposed. The electric field applying means 30 has a pectinate first electrode 31a and a pectinate second electrode 32a as shown in the schematic plan view in FIG. 4.

Figure 4:
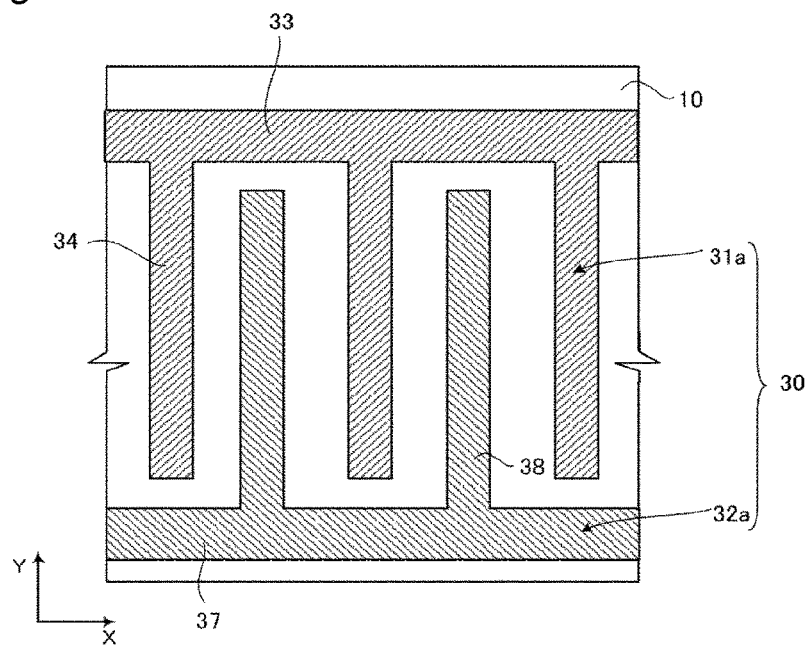
FIG. 4 is a plan view illustrating the structure of a voltage applying means according to the second embodiment.

The first electrode 31 has, as shown in FIG. 4, a line-shape connecting portion 33 extending in the X direction in the vicinity of one side of the first substrate 10, and a plurality of line-shape pectinate portions 34 extending in the Y direction from the connecting portion 33 toward an opposing side. The second electrode 32 has a line-shape connecting portion 37 extending in the X direction in the vicinity of a side opposing the connecting portion 33 of the first electrode 31, and a plurality of line-shape pectinate portions 38 extending in the Y-direction from the connecting portion 37 toward the opposing connecting portion 33. The pectinate portions 34 and 38 are alternately disposed in parallel with each other. The pectinate portions 34 and 38 form an electrode pair to generate an electric field in the electrooptical functional layer 1.

In the second embodiment, when a voltage is applied, an electric field containing lines of electric force in a direction in parallel with the substrate surface is generated, and molecules of the liquid crystal compound 2 tend to move so that the long axes agree with the direction of the lines of electric force. At that time, the molecules of the liquid crystal compound 2 in the vicinity of the alignment controlling material 3 are prevented from moving so that the long axes agree with the direction of the lines of electric force by the alignment controlling material 3, and they take directions different from the lines of electric force. That is, by using the alignment controlling material 3, not all the molecules of the liquid crystal compound 2 are aligned so that the long axes are in a direction which agrees with the lines of electric force when a voltage is applied, and the long axes of the liquid crystal compound 2 are directed in a plurality of directions. As a result, the ordered structure is disturbed, to show a scattering state.

According to the liquid crystal optical device of the second embodiment, the following effects can be obtained in addition to the effects of the liquid crystal optical device of the first embodiment. That is, when it is applied to a liquid crystal optical device using an electric field applying means including a horizontal electric field, the electric field intensity is not influenced by the distance between the substrates, and it is therefore possible to take a larger margin in the thickness direction. Accordingly, it becomes easy to produce a large-sized liquid crystal optical device also from such a viewpoint. Further, with the liquid crystal compound having a positive dielectric anisotropy, the absolute value of Δ∈ can be made larger than a liquid crystal compound having a negative dielectric anisotropy, whereby it becomes possible to lower the driving voltage of the liquid crystal optical device.

(Modified Example)

Now, a modified example different from the above embodiments will be described, but the present invention is by no means limited to the above embodiment and the modified example, and various modifications are possible.

Instead of a case of using two plane substrates as a pair of substrates facing each other, a pair of substrates may be made of a plane substrate and a curved substrate. Otherwise, a pair of substrates may be made by combining two substrates each having a curved portion and a plane portion into a pair; a pair of substrates may be formed by combining two curved substrates; or a polyhedral substrate may be used.

In the above first embodiment, as an electric field applying means, a pectinate first electrode 31 and a pectinate second electrode 32 are used, however, instead of such electrodes, a pectinate electrode may be formed as one electrode, and a plane electrode as the other electrode may be provided below the pectinate electrode, on the same substrate. Or, a slit electrode may be formed as one electrode, and a plane electrode as the other electrode may be provided below the slit electrode.

Otherwise, a third electrode may be provided on the second substrate, to provide both application modes of a vertical electric field and horizontal electric field, by applying an electric field between the first electrode and the third electrode, between the second electrode and the third electrode, or between the first electrode, and the second and third electrodes at the same potential. By such a constitution, in the transmission/scattering mode according to the above embodiments, it becomes possible to increase the response speed into a transparent state or to polymerize liquid crystal/curable compounds in a state where the liquid crystal is aligned by an external electric field.

In the above embodiments, a liquid crystal optical device having a transmission/scattering mode has been described, however, the present invention may be applied also to a liquid crystal optical device, of which optical properties such as the refractive index, etc. are changed. Further, by using a TFT substrate as the first substrate, it becomes possible to control the transmission/scattering mode with respect to each pixel. In such a case, as an electric field applying means, a pixel electrode (first electrode), a counter electrode (second electrode), a switching element, a wiring to supply signals to the switching element, etc. may be formed below the first alignment functional layer. Further, it is possible to impart colors by using a color filter substrate as the second substrate.

In the above embodiments, an alignment controlling material is used as a means for controlling the alignment of the liquid crystal molecules, however, an alignment controlling material and an alignment functional layer may be used in combination to control the alignment of the liquid crystal molecules.

The liquid crystal optical device of the present invention can control transmission/scattering by application/non-application of a voltage, and may thereby be suitably applied to a liquid crystal optical shutter, a liquid crystal light control device, a transparent display, etc. Further, it can control the optical state by application/non-application of a voltage, and is thereby useful as an optical modulation device. Further, it is also useful for a show window, a bulletin board, an instrument panel of an automobile, etc. which display characters or patterns.

EXAMPLES

Now, the present invention will be described in further detail with reference to Examples. However, it should be understood that the present invention is by no means restricted to such specific Examples.

Ex. 1-1 to Ex. 3-1

As a liquid crystal compound, a nematic liquid crystal (Tc=98° C., Δ∈=−5.6, Δn=0.220) having a negative dielectric anisotropy was used. As curable compounds, a non-liquid crystalline curable compound of the formula (a) (ST03776, manufactured by Synthon Chemicals) and/or a liquid crystalline curable compound of the formula (b) (LC242, manufactured by BASF, Cr 65 N 118 I) were used. The mass ratio of the liquid crystal compound to the non-liquid crystalline curable compound and the liquid crystalline curable compound in each Ex. is shown in Table 1. As another component, a polymerization initiator (BiPE (TCI)) was used.

Formula (a)

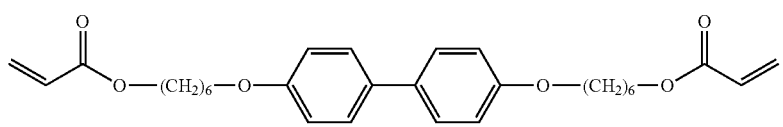

-continued

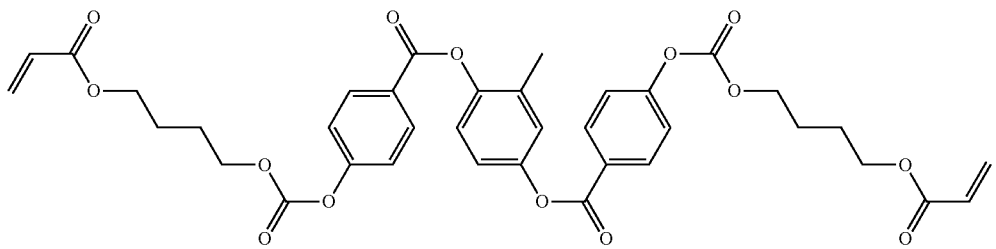

Formula (b)

To the liquid crystal compound and the curable compound(s) in the mass ratio as shown in Table 1, the polymerization initiator in an amount of 1 mass % to the total amount of the curable compound(s) was mixed, and the mixture was heated and stirred on a hot stirrer set at 80° C. to obtain a liquid crystal composition having the curable compound(s) uniformly dissolved in the liquid crystal compound. Here, Ex. 1-2, 1-3, 2-2 and 2-3 are Examples of the present invention, and other Ex. 1-1, Ex. 1-4, Ex. 1-5, Ex. 2-1, Ex. 2-4, Ex. 2-5 and Ex. 3-1 are Comparative Examples.

TABLE 1

|  | Liquid crystal compound | Non-liquid crystalline curable compound Formula (a) | Liquid crystalline curable compound Formula (b) |
|---|---|---|---|
| Ex. 1-1 | 80 | 20 | 0 |
| Ex. 1-2 |  | 16 | 4 |
| Ex. 1-3 |  | 12 | 8 |
| Ex. 1-4 |  | 8 | 12 |
| Ex. 1-5 |  | 0 | 20 |
| Ex. 2-1 | 90 | 10 | 0 |
| Ex. 2-2 |  | 8 | 2 |
| Ex. 2-3 |  | 6 | 4 |
| Ex. 2-4 |  | 4 | 6 |
| Ex. 2-5 |  | 0 | 10 |
| Ex. 3-1 | 70 | 12 | 18 |

<Room Temperature Storage Stability Evaluation>

The above liquid crystal composition having the curable compound(s) uniformly dissolved, was left to stand still for one hour in an environment at room temperature of 25° C. Thereafter, the liquid crystal composition was sandwiched between a slide glass and a prepared slide, whereupon the presence or absence of precipitation of the curable compound(s) was evaluated. A case where no precipitation was observed was evaluated to be A (Good), and a case where precipitation was observed was evaluated to be B (Bad).

The evaluation results are shown in Table 2. In Ex. 1-1 and Ex. 2-1 wherein only the non-crystalline curable compound was used as the curable compound, and in Ex. 3-1 wherein the curable compounds were at least 20 mass % in the liquid crystal composition, a precipitate was observed, as shown in Table 2. The precipitate is the non-liquid crystalline curable compound, and the cause for precipitation is attributable to the low solubility of the non-liquid crystalline curable compound. In each case other than the above-mentioned three cases, no precipitation was observed. It is evident that good compatibility is obtainable by incorporating the curable compounds in the liquid crystal composition in an amount of at least 8 mass % and less than 20 mass % of the entirety.

<Preparation of Liquid Crystal Optical Device>

On a pair of glass substrates, as transparent electrodes, ITO (indium tin oxide) thin films were formed to obtain electrode patterns. Then, as an insulating film, a $SiO_2$—$TiO_2$ type metal oxide film was formed on the entire surface in a thickness of about 50 μm. Further, thereon, an alignment film made of a polyimide thin film was formed with a pretilt angle of about 90°. The above pair of glass substrates were disposed to face each other via a spacer made of resin beads having a diameter of 6 μm and sealed with an epoxy resin except for a hole for injecting a liquid crystal composition, to prepare a liquid crystal cell. Into this liquid crystal cell, the liquid crystal composition prepared at room temperature was filled by a vacuum injection method, whereupon the injection hole was sealed with an ultraviolet-curable sealing material. While holding this cell at 30° C., ultraviolet rays of 2 $mW/cm^2$ were applied from above and below by a chemical lamp with the main wavelength being 365 nm, to cure the curable compounds to produce a liquid crystal optical device.

In Ex. 1-1, 2-1 and 3-1 wherein precipitation was observed in the room temperature storage stability evaluation, it was not possible to prepare a liquid crystal optical device, but by the liquid crystal composition in each Ex. other than these three Ex., it was possible to prepare a liquid crystal optical device. The obtained liquid crystal optical device exhibited a transparent state, and when a rectangular voltage of 40 V at 100 Hz was applied between the pair of ITO electrodes, the liquid crystal optical device exhibited a scattering state. That is, it was possible to obtain a liquid crystal optical device which shows a transparent state when no voltage is applied and which shows a scattering state when a voltage is applied. The haze value in the above transparent state was at most 2% in each sample of the case where it was possible to prepare a liquid crystal optical device, and thus, good transparency was obtained.

<Evaluation of Properties of Liquid Crystal Optical Device>

By means of a Schlieren optical system with a converging angle of 5°, the transmittance of the present liquid crystal optical device was measured, and a value calculated by using, as the numerator, the transmittance value in a transparent state in a no voltage application state and, as the denominator, the transmittance in a scattering state in a voltage application state of 40 V at 100 Hz, was adopted as the device contrast. The device contrast is preferably at least 10 from the viewpoint of optical effects. Further, in a scattering state in a voltage application state of 40 V at 100 Hz, a light source was set on the back side of the device, and coloration of the front scattering light transmitted to the opposite side was also evaluated. These results are shown in Table 2. In Ex. 1-4, the scattering was so weak that the scattering property was not confirmed. Further, in Ex. 1-5, Ex. 2-4 and Ex. 2-5, coloration to red or reddish green was observed as shown in Table 2. Whereas, in Ex. 1-2, Ex. 1-3, Ex. 2-2 and Ex. 2-3, no coloration was observed and the device was confirmed to be colorless.

TABLE 2

| | State of liquid crystal composition | Liquid crystal optical device | |
|---|---|---|---|
| | Room temperature storage stability | Contrast (when 40 V was applied) | Coloration in scattering state |
| Ex. 1-1 | B | — | — |
| Ex. 1-2 | A | 40 | Nil |
| Ex. 1-3 | A | 42 | Nil |
| Ex. 1-4 | A | 2 | - (Not confirmed since scattering was weak) |
| Ex. 1-5 | A | 21 | Yes (red) |
| Ex. 2-1 | B | — | — |
| Ex. 2-2 | A | 25 | Nil |
| Ex. 2-3 | A | 42 | Nil |
| Ex. 2-4 | A | 56 | Yes (reddish green) |
| Ex. 2-5 | A | 35 | Yes (red) |
| Ex. 3-1 | B | — | — |

Ex. 4-1 to Ex. 4-5

A liquid crystal composition was obtained in the same manner as in the above Ex. 1-1, etc., except that as a curable compound, the non-liquid crystalline curable compound of the formula (a) and/or a liquid crystalline curable compound of the formula (c) (ST00975, manufactured by Synthon Chemicals, Cr 86 N 116 I) was used, and mixing was conducted in the mass ratio as shown in Table 3.

Here, Ex. 4-2 and Ex. 4-3 are Examples of the present invention, and other Ex. 4-1, 4-4 and 4-5 are Comparative Examples.

TABLE 3

| | Liquid crystal compound | Non-liquid crystalline curable compound Formula (a) | Liquid crystalline curable compound Formula (c) |
|---|---|---|---|
| Ex. 4-1 | 90 | 10 | 0 |
| Ex. 4-2 | | 8 | 2 |
| Ex. 4-3 | | 6 | 4 |
| Ex. 4-4 | | 4 | 6 |
| Ex. 4-5 | | 0 | 10 |

The room temperature storage stability and the properties of the liquid crystal optical device in Ex. 4-1 to 4-5 were evaluated in the same manner as in the above Ex., and the results are shown in Table 4. The evaluation method was the same as described in Ex. 1-1, etc.

TABLE 4

| | State of liquid crystal composition | Liquid crystal optical device | |
|---|---|---|---|
| | Room temperature storage stability | Contrast (when 40 V was applied) | Coloration in scattering state |
| Ex. 4-1 | B | — | — |
| Ex. 4-2 | A | 25 | Nil |
| Ex. 4-3 | A | 42 | Nil |
| Ex. 4-4 | A | 4.3 | - (Not confirmed since scattering was weak) |
| Ex. 4-5 | A | 14 | Yes (red) |

The room temperature storage stability evaluation was conducted, whereby in Ex. 4-1, precipitation was observed, but in other samples, no precipitation was observed. It is seen that good compatibility is obtainable by making the content of the non-liquid crystalline curable compound lager than the content of the liquid crystalline curable compound, and adjusting the content of the curable compounds to be at least 8 mass % and less than 20 mass % of the entirety.

In Ex. 4-1 wherein precipitation was observed in the room temperature storage stability evaluation, it was not possible to prepare a liquid crystal optical device, but by each of other liquid crystal compositions, it was possible to prepare a liquid crystal optical device. The obtained liquid crystal optical device exhibited a transparent state, and when a

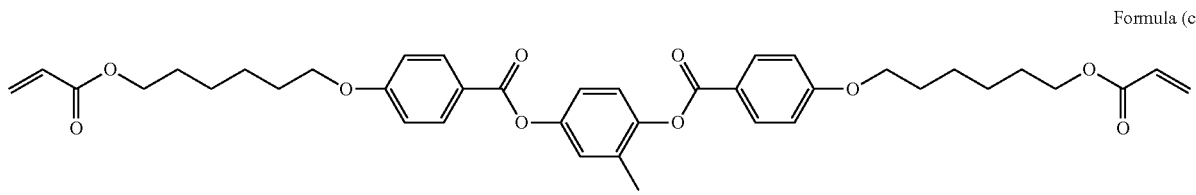 [SMILES: C=CC(=O)OCCCCCCOc1ccc(C(=O)Oc2ccc(OC(=O)c3ccc(OCCCCCCOC(=O)C=C)cc3)c(C)c2)cc1]
Formula (c)

rectangular voltage of 40 V at 100 Hz was applied between the pair of ITO electrodes, the liquid crystal optical device exhibited a scattering state. That is, it was possible to obtain a liquid crystal optical device which shows a transparent state when no voltage is applied and which shows a scattering state when a voltage is applied. The haze value in the above transparent state was at most 2% in each sample of the case where it was possible to prepare a liquid crystal optical device, and thus, good transparency was obtained.

Then, coloration of the front scattering light was also evaluated by the same method as described above. In Ex. 4-4, the scattering was so weak that the scattering property was not confirmed. Further, in the sample of Ex. 4-5, coloration to red was observed. Whereas, in the samples of Ex. 4-2 and Ex. 4-3, no coloration was observed, and they were confirmed to be colorless.

Ex. 5-1 to Ex. 5-5

A liquid crystal composition was obtained in the same manner as in the above Ex. 1-1, etc., except that as a curable compound, at least one of the non-liquid crystalline curable compound of the formula (a), the non-liquid crystalline curable compound of the formula (d) and the liquid crystalline curable compound of the formula (c) was used, and mixing was conducted in the mass ratio as shown in Table 5.

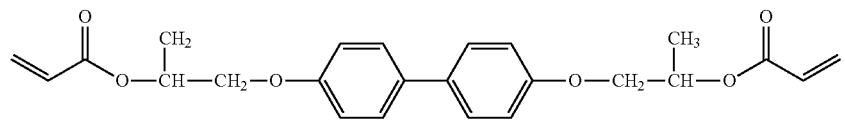

Formula (d)

Here, Ex. 5-2 and Ex. 5-3 are Examples of the present invention, and other Ex. 5-1, 5-4 and 5-5 are Comparative Examples.

TABLE 5

| | Liquid crystal compound | Non-liquid crystalline curable compound | | Liquid crystalline curable compound |
|---|---|---|---|---|
| | | Formula (a) | Formula (d) | Formula (c) |
| Ex. 5-1 | 90 | 8 | 2 | 0 |
| Ex. 5-2 | | 6.4 | 1.6 | 2 |
| Ex. 5-3 | | 4.8 | 1.2 | 4 |
| Ex. 5-4 | | 3.2 | 0.8 | 6 |
| Ex. 5-5 | | 0 | 0 | 10 |

The room temperature storage stability and the properties of the liquid crystal optical device in Ex. 5-1 to 5-5 were evaluated in the same manner as in the above Ex., and the results are shown in Table 6. The evaluation method was the same as described in Ex. 1-1, etc.

TABLE 6

| | State of liquid crystal composition | Liquid crystal optical device | |
|---|---|---|---|
| | Room temperature storage stability | Contrast (when 40 V was applied) | Coloration in scattering state |
| Ex. 5-1 | B | — | — |
| Ex. 5-2 | A | 35 | Nil |
| Ex. 5-3 | A | 28 | Nil |
| Ex. 5-4 | A | 6.2 | Yes (red) |
| Ex. 5-5 | A | 14 | Yes (red) |

The room temperature storage stability evaluation was conducted, whereby in Ex. 5-1, precipitation was observed, but in other samples, no precipitation was observed. It is seen that good compatibility is obtainable by making the content of the non-liquid crystalline curable compound lager than the content of the liquid crystalline curable compound, and adjusting the content of the curable compounds to be at least 8 mass % and less than 20 mass % of the entirety.

In Ex. 5-1 wherein precipitation was observed in the room temperature storage stability evaluation, it was not possible to prepare a liquid crystal optical device, but by each of other liquid crystal compositions, it was possible to prepare a liquid crystal optical device. The obtained liquid crystal optical device exhibited a transparent state, and when a rectangular voltage of 40 V at 100 Hz was applied between the pair of ITO electrodes, the liquid crystal optical device exhibited a scattering state. That is, it was possible to obtain a liquid crystal optical device which shows a transparent state when no voltage is applied and which shows a scattering state when a voltage is applied. The haze value in the above transparent state was at most 2% in each sample of the case where it was possible to prepare a liquid crystal optical device, and thus, good transparency was obtained.

Then, coloration of the front scattering light was also evaluated by the same method as described above. As the results of the evaluations, in the samples of Ex. 5-4 and 5-5, coloration to red was observed. Whereas, in the samples of Ex. 5-2 and Ex. 5-3, no coloration was observed, and they were confirmed to be colorless.

Ex. 6-1 to Ex. 6-5

A liquid crystal composition was obtained in the same manner as in the above Ex. 1-1, etc., except that as curable compounds, at least one of the non-liquid crystalline curable compound of the formula (a) and the liquid crystalline curable compound of the formula (c), and a non-liquid crystalline curable compound of the formula (e) (A-PTMG 65, manufactured by Shin-Nakamura Chemical Co., Ltd.) to improve the flexibility of the alignment controlling material, were used, and mixing was conducted in the mass ratio as shown in Table 7.

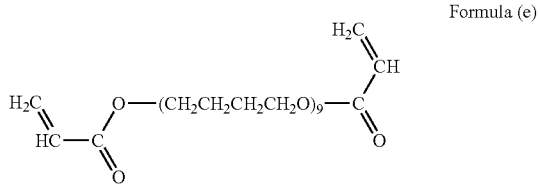

Formula (e)

Here, Ex. 6-2 and Ex. 6-3 are Examples of the present invention, and other Ex. 6-1, 6-4 and 6-5 are Comparative Examples.

TABLE 7

| | Liquid crystal compound | Non-liquid crystalline curable compound | | Liquid crystalline curable compound |
|---|---|---|---|---|
| | | Formula (a) | Formula (e) | Formula (c) |
| Ex. 6-1 | 90 | 8.0 | 2 | 0 |
| Ex. 6-2 | | 6 | 2 | 2.0 |
| Ex. 6-3 | | 4 | 2 | 4.0 |
| Ex. 6-4 | | 2 | 2 | 6.0 |
| Ex. 6-5 | | 0 | 2 | 8 |

The room temperature storage stability and the properties of the liquid crystal optical device in Ex. 6-1 to 6-5 were evaluated in the same manner as in the above Ex., and the results are shown in Table 8. The evaluation method was the same as described in Ex. 1-1, etc.

TABLE 8

| | State of liquid crystal composition | Liquid crystal optical device | |
|---|---|---|---|
| | Room temperature storage stability | Contrast (when 40 V was applied) | Coloration in scattering state |
| Ex. 6-1 | B | — | — |
| Ex. 6-2 | A | 20 | Nil |
| Ex. 6-3 | A | 28 | Nil |
| Ex. 6-4 | A | 3.2 | - (Not confirmed since scattering was weak) |
| Ex. 6-5 | A | 10 | Yes (red) |

The room temperature storage stability evaluation was conducted, whereby in Ex. 6-1, precipitation was observed, but in other samples, no precipitation was observed. It is seen that good compatibility is obtainable by making the content of the non-liquid crystalline curable compound(s) lager than the content of the liquid crystalline curable compound, and adjusting the content of the curable compounds to be at least 8 mass % and less than 20 mass % of the entirety.

In Ex. 6-1 wherein precipitation was observed in the room temperature storage stability evaluation, it was not possible to prepare a liquid crystal optical device, but by each of other liquid crystal compositions, it was possible to prepare a liquid crystal optical device. The obtained liquid crystal optical device exhibited a transparent state, and when a rectangular voltage of 40 V at 100 Hz was applied between the pair of ITO electrodes, the liquid crystal optical device exhibited a scattering state. That is, it was possible to obtain a liquid crystal optical device which shows a transparent state when no voltage is applied and which shows a scattering state when a voltage is applied. The haze value in the above transparent state was at most 2% in each sample of the case where it was possible to prepare a liquid crystal optical device, and thus, good transparency was obtained.

Then, coloration of the front scattering light was also evaluated by the same method as described above. As the results of the evaluations, in Ex. 6-4, scattering was so weak that no scattering property was confirmed. Further, in the sample of Ex. 6-5, coloration to red was observed. Whereas, in the samples of Ex. 6-2 and Ex. 6-3, no coloration was observed, and they were confirmed to be colorless.

As these Examples show, the following effects are obtainable by satisfying all of conditions that as curable compounds, a mixture of a non-liquid crystalline curable compound and a liquid crystalline curable compound is used, that the content of the curable compounds is adjusted to be at least 8 mass % and less than 20 mass % of the entirety and that the non-liquid crystalline curable compound is adjusted to be larger in amount than the liquid crystalline curable compound. That is, a liquid crystal composition excellent in compatibility at room temperature is obtainable. And, in a liquid crystal optical device, the contrast properties are excellent, and in its scattering state, good results free from coloration of transmitted light are obtainable. Further, it has been confirmed that depending upon each liquid crystal composition, the value of the contrast may substantially vary, but the above mentioned conclusions can be sustained by each sample. The reason as to why it is possible to satisfy both the compatibility and the liquid crystal optical device properties, is considered to be such that by maintaining the balance in the amount ratio of the liquid crystalline curable compound and the non-liquid crystalline curable compound within the specific range, it is possible to properly form a domain size in the phase separation stage to form an alignment controlling material, while maintaining the compatibility in the liquid crystal composition.

REFERENCE SYMBOLS

1: Electrooptical functional layer
2: Liquid crystal compound
3: Alignment controlling material
10: First substrate
11: First alignment functional layer
20: Second substrate
21: Second alignment functional layer
30: Electric field applying means
31: First electrode
32: Second electrode
33, 37: Connecting portions
34, 38: Pectinate portions
100: Liquid crystal optical device The entire disclosure of Japanese Patent Application No. 2015-155776 filed on Aug. 6, 2015 including specification, claims, drawings and summary is incorporated herein by reference in its entirety.

What is claimed is:

1. A liquid crystal composition, comprising:
a liquid crystal compound which shows liquid crystallinity and which is a non-curable compound;
a liquid crystalline curable compound having a polymerizable functional group; and
at least one non-liquid crystalline curable compound having a polymerizable functional group,
wherein the non-liquid crystalline curable compound is included at a content larger than a content of the liquid crystalline curable compound,
the liquid crystalline curable compound and the non-liquid crystalline curable compound are included in a total amount of at least 8 mass% and less than 20 mass% with respect to an entire amount of the liquid crystal composition,
the at least one non-liquid crystalline curable compound comprises a compound of formula (1):

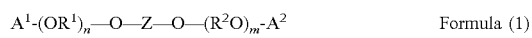   Formula (1)

where $A^1$ and $A^2$ are each independently an acryloyl group, a methacryloyl group, a glycidyl group or an allyl group, $R^1$ and $R^2$ are each independently a $C_{2-6}$ alkylene group, Z is a divalent mesogenic structure moiety, and n and m are each independently an integer of from 1 to 10, and the non-liquid crystalline curable compound further includes a compound of formula (2):

   Formula (2)

where $A^3$ to $A^5$ are each independently an acryloyloxy group, a methacryloyloxy group, a vinyl ether group, a vinyl group or a glycidyl ether group, $R^3$ is a linear or branched $C_{1-50}$ mono- to tri-valent organic group which may have one or more etheric oxygen atoms between carbon atoms, and p, q and r are each independently from 0 to 3, provided p+q+r=1 to 3.

2. The liquid crystal composition according to claim 1, wherein
in the formula (1) n and m are each independently an integer of from 1 to 4.

3. The liquid crystal composition according to claim 2, wherein
in the formula (2) $A^3$ to $A^5$ are each independently an acryloyloxy group, a methacryloyloxy group, or a vinyl ether group.

4. The liquid crystal composition according to claim 1, wherein the liquid crystalline curable compound is included at a content of less than 10 mass% of the total amount of the liquid crystal composition.

5. The liquid crystal composition according to claim 1, wherein the liquid crystalline curable compound is a bifunctional curable compound.

6. A liquid crystal optical device, comprising:
a pair of substrates, at least one of which is transparent;
an electrooptical functional layer sandwiched between the pair of substrates; and
an electric field applying device configured to generate an electric field in the electrooptical functional layer,
wherein the electrooptical functional layer includes a liquid crystal compound and an alignment controlling material which controls an alignment of the liquid crystal compound,
the alignment controlling material is included in an amount of at least 8 mass % and less than 20 mass % based on an entire electrooptical functional layer, and the alignment controlling material includes one derived from a non-liquid crystalline curable compound at a larger proportion than one derived from a liquid crystalline curable compound,
the at least one non-liquid crystalline curable compound comprises a compound of formula (1):

$$A^1\text{-}(OR^1)_n\text{---}O\text{---}Z\text{---}O\text{---}(R^2O)_m\text{-}A^2 \quad \text{Formula (1)}$$

where $A^1$ and $A^2$ are each independently an acryloyl group, a methacryloyl group, a glycidyl group or an allyl group, $R^1$ and $R^2$ are each independently a $C_{2-6}$ alkylene group Z is a divalent mesogenic structure moiety, and n and m are each independently an integer of from 1 to 10, and
the non-liquid crystalline curable compound further includes a compound of formula (2):

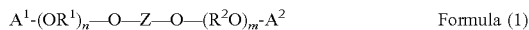

Formula (2)

where $A^3$ to $A^5$ are each independently an acryloyloxy group, a methacryloyloxy group, a vinyl ether group, a vinyl group or a glycidyl ether group, $R^3$ is a linear or branched $C_{1-50}$ mono- to tri-valent organic group which may have one or more etheric oxygen atoms between carbon atoms, and p, q and r are each independently from 0 to 3, provided p+q+r=1 to 3.

7. The liquid crystal optical device according to claim 6, which exhibits a transparent state when no voltage is applied and exhibits a state to scatter incident light when a voltage is applied.

8. The liquid crystal composition according to claim 1, wherein in the formula (2) $R^3$ is
—$R^4$— or
$(R^5$—$O)_n$—$R^5$— where $R^4$ is a $C_{2-20}$ linear or branched alkylene group, $R^5$ is a $C_{2-8}$ linear or branched alkylene group, and n is an integer of from 1 to 10.

9. The liquid crystal composition according to claim 8, wherein $R^3$ is —$R^4$— where $R^4$ is a $C_{2-20}$ linear alkylene group.

10. The liquid crystal composition according to claim 8, wherein $R^3$ is $(R^5$—$O)_n$—$R^5$— where $R^5$ is —$(CH_2)_s$—, —$CH_2$—$CH(CH_3)$—, —$CH_2$—$CH_2$—$CH(CH_3)$— or —$CH_2$—$CH_2$—$C(CH_3)_2$—, and s is an integer of from 2 to 5.

11. The liquid crystal composition according to claim 10, wherein n is an integer of from 1 to 6.

12. The liquid crystal composition according to claim 1, wherein the compound of formula (2) has a formula of $A^3$-$R^3$-$A^4$.

13. The liquid crystal optical device according to claim 6, wherein in the formula (2) $R^3$ is
—$R^4$— or
$(R^5$—$O)_n$—$R^5$— where $R^4$ is a $C_{2-20}$ linear or branched alkylene group, $R^5$ is a $C_{2-8}$ linear or branched alkylene group, and n is an integer of from 1 to 10.

14. The liquid crystal optical device according to claim 13, wherein $R^3$ is —$R^4$— where $R^4$ is a $C_{2-20}$ linear alkylene group.

15. The liquid crystal optical device according to claim 13, wherein $R^3$ is $(R^5$—$O)_n$—$R^5$— where $R^5$ is —$(CH_2)_s$—, —$CH_2$—$(CH_3)$—, —$CH_2$—$CH_2$—$CH(CH_3)$— or —$CH_2$—$CH_2$—$C(CH_3)_2$—, and s is an integer of from 2 to 5.

16. The liquid crystal optical device according to claim 15, wherein n is an integer of from 1 to 6.

17. The liquid crystal optical device according to claim 6, wherein the compound of formula (2) has a formula of $A^3$-$R^3$-$A^4$.

18. The liquid crystal composition according to claim 1, wherein the compound of formula (2) is a compound of one of Formulas (7) to (11):

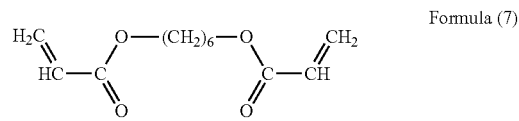

Formula (7)

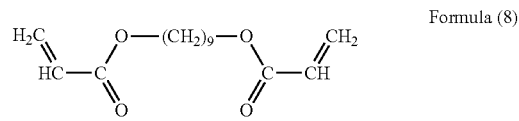

Formula (8)

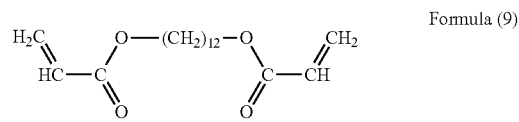

Formula (9)

Formula (10)
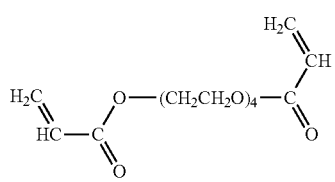
Formula (11)
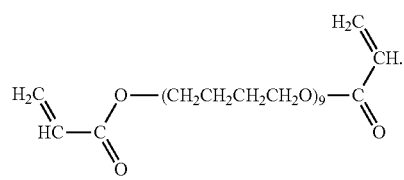
19. The liquid crystal composition according to claim 1, wherein the liquid crystalline curable compound is a compound of one of Formulas (12) to (28):
Formula (12)
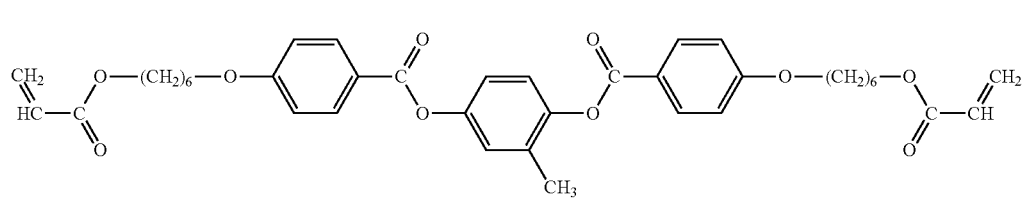
Formula (13)
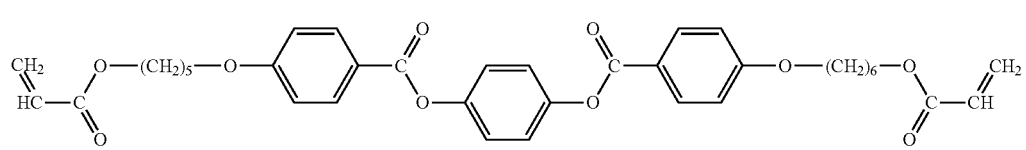
Formula (14)
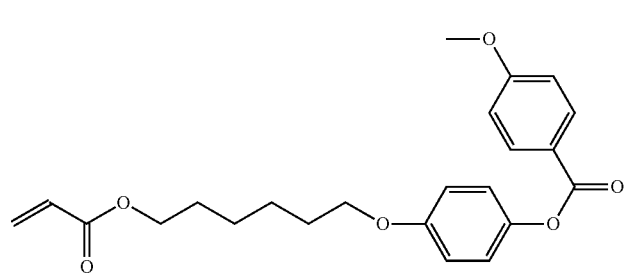
Formula (15)
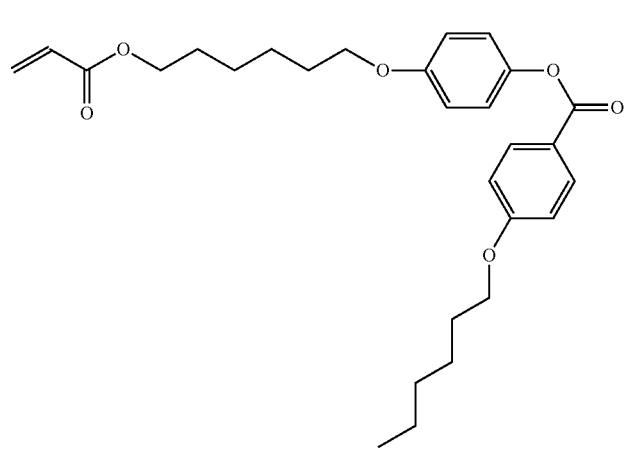
Formula (16)
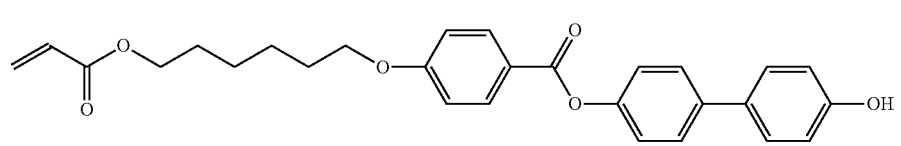

-continued
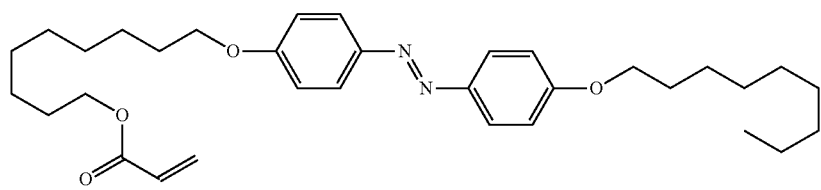
Formula (17)
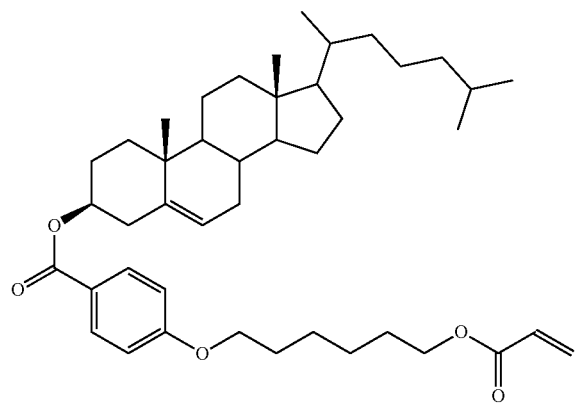
Formula (18)
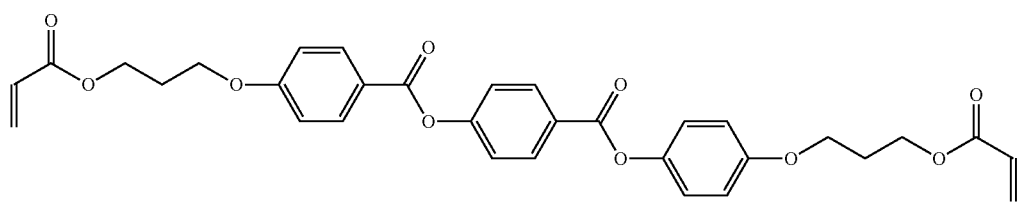
Formula (19)
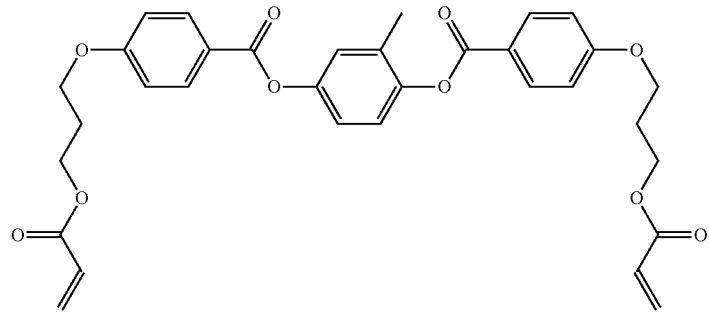
Formula (20)
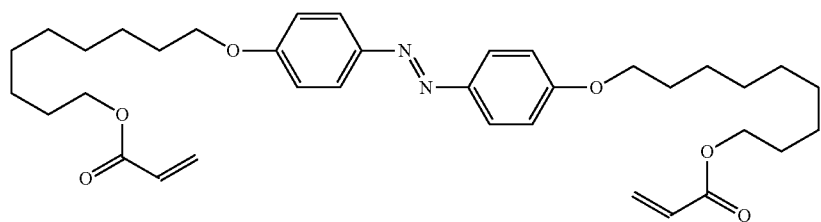
Formula (21)

-continued
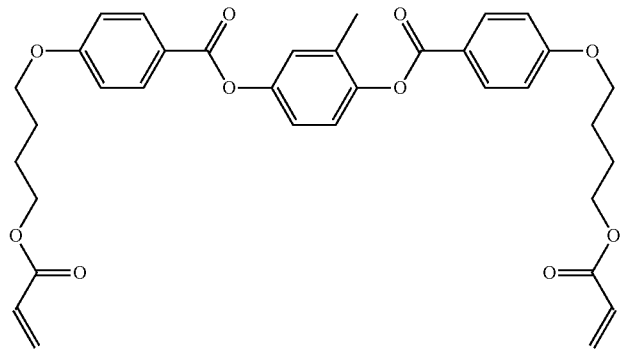
Formula (22)
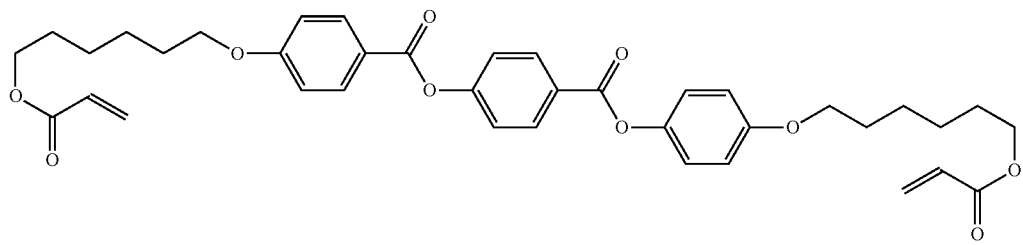
Formula (23)
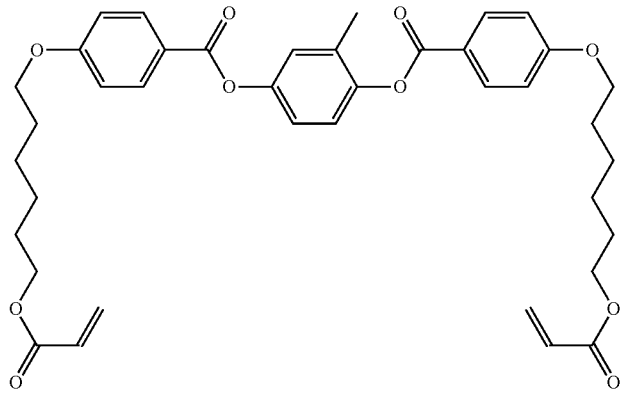
Formula (24)
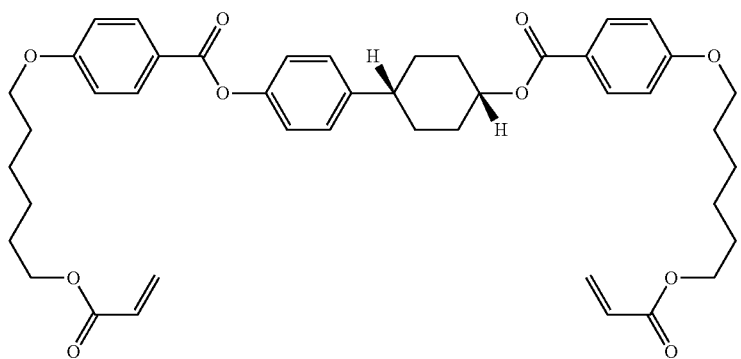
Formula (25)

-continued
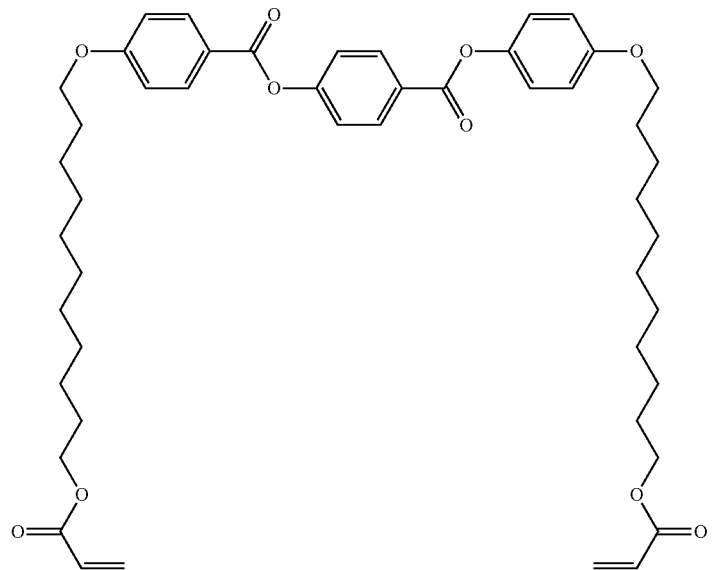
Formula (26)
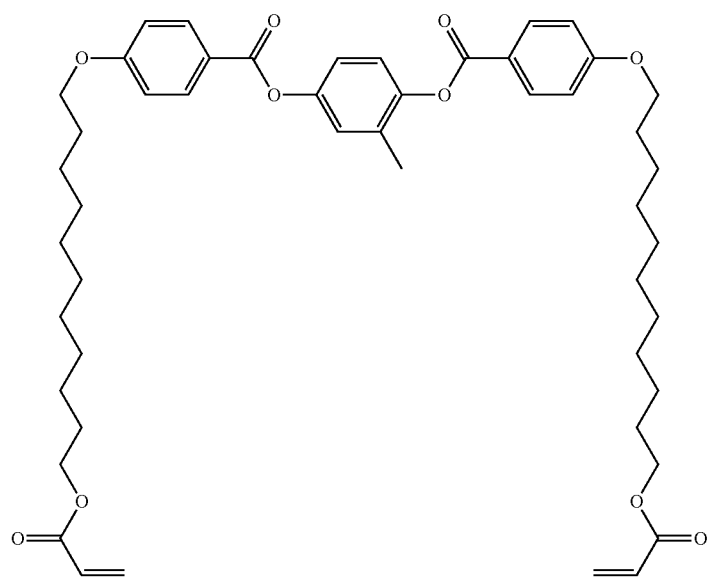
Formula (27)
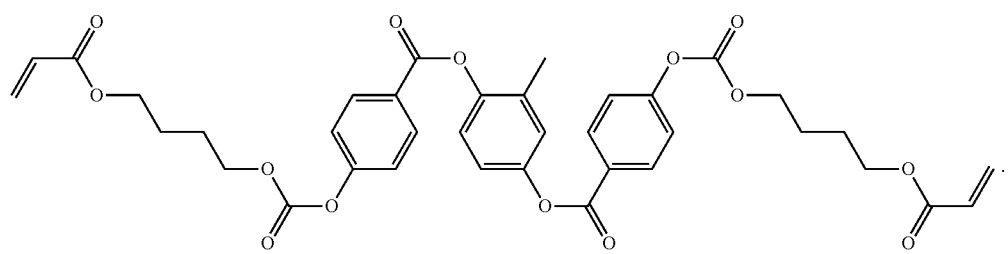
Formula (28)
20. The liquid crystal composition according to claim 1, wherein the at least one non-liquid crystalline curable compound comprises at least one of a compound of formula (a) and a compound of formula (d):

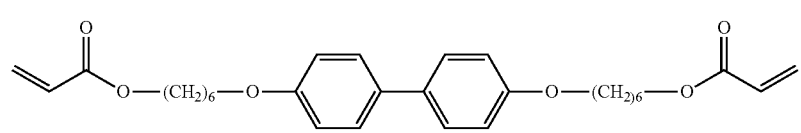
formula (a)
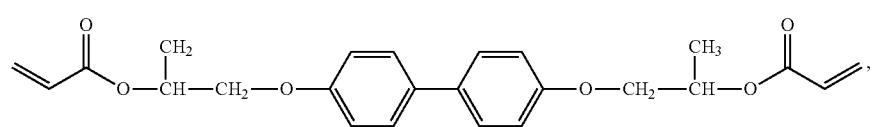
formula (d)
and
the liquid crystalline curable compound is a compound of formula (b) or a compound of formula (c):
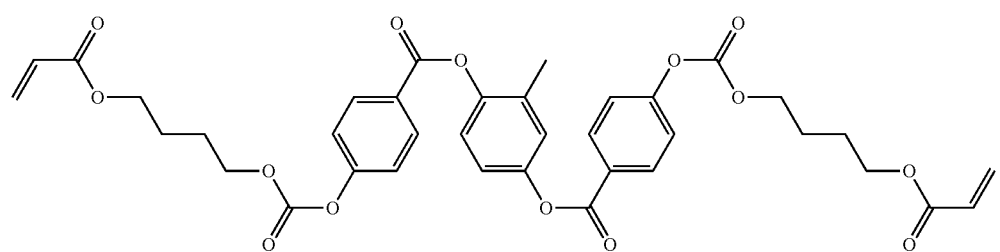
formula (b)
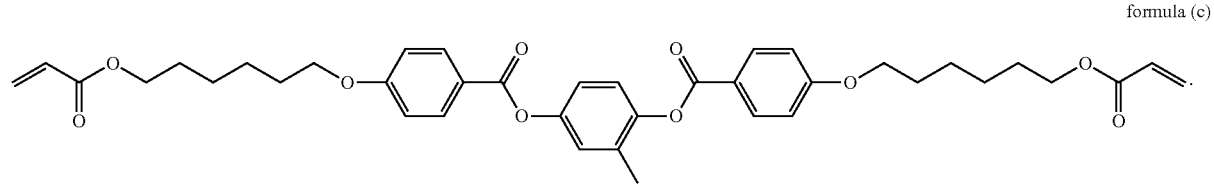
formula (c)
\* \* \* \* \*